3,206,470
NOVEL PYRROLO[1,2-α]INDOLES
George Rodger Allen, Jr., Old Tappan, N.J., John Frank Poletto, Nanuet, and William Alan Remers, Pearl River, N.Y., and Martin Joseph Weiss, Oradell, and John Schurr Webb, Woodcliff Lake, N.J., assignors to American Cyanamid Company, Stamford, Conn., a corporation of Maine
No Drawing. Filed June 7, 1962, Ser. No. 200,649
12 Claims. (Cl. 260—319)

This invention relates to novel substituted pyrrolo[1,2-α]indoles of the formula:

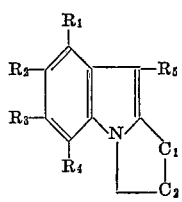

wherein $R_1$ is hydrogen, hydroxy, or lower alkanoyloxy; $R_2$ is hydroxy, lower alkoxy, lower alkanoyloxy, or mononuclear aralkoxy; $R_3$ is hydrogen or lower alkyl; $R_4$ is hydrogen, hydroxy, or lower alkanoyloxy; $R_5$ is hydrogen, formyl, cyano, α-hydroxylower alkyl, nitroso, halogen, α-mononuclear aryloxycarbonyloxylower alkyl, or isonitrosolower alkyl; and

is a divalent radical of the group consisting of

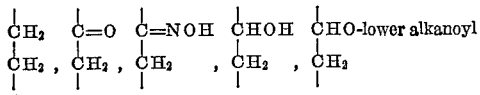

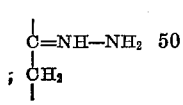

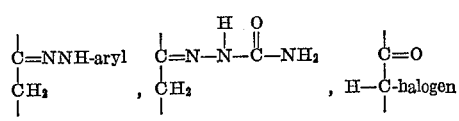

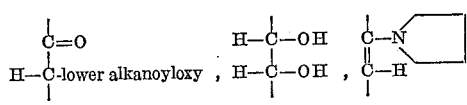

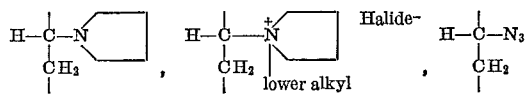

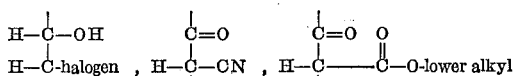

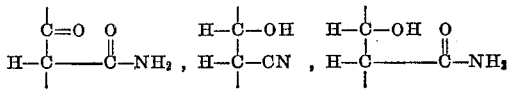

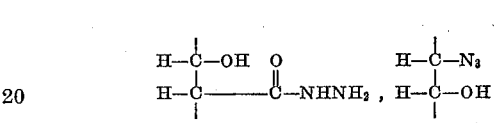

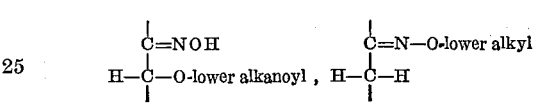

and

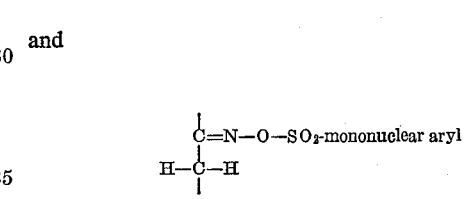

The numbering system for the ring positions of the compounds of this invention may be indicated as follows:

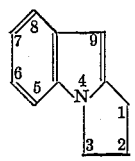

The substituted pyrrolo[1,2-α]indoles of this invention are useful antimicrobial agents and are active *in vitro* against a variety of microorganisms including gram-positive and gram-negative bacteria and fungi. Typical compounds of the invention inhibit growth in vitro of such organisms as *Mycobacterium smegmatis* ATCC 607, *Staphylococcus aureus* ATCC 6548P, *Streptococcus faecalis* ATCC 8043, *Bacillus subtilis* ATCC 6633, *Proteus*

*vulgaris* ATCC 9484, *Fusarium episphaeria* F–105, *Hormodendrum cladosporoides* Z–516, *Trichophyton mentagrophytes* E–11, *Microsporum gypseum* E–28, *Memnoniella echinata* Z–583, and *Chaetomium globosum* H–71.

The novel substituted pyrrolo[1,2-α]indoles of this invention are also useful as intermediates for the preparation of the novel antibiotic products which form the subject matter of the copending application of Mowat et al., Serial No. 200,667, filed concurrently herewith.

This invention also relates to compounds of the formula:

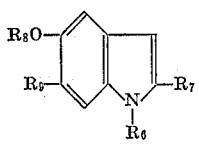

wherein $R_6$ is β-carbolower alkoxy lower alkyl, β-carboxylower alkyl, or β-carboxamidolower alkyl; $R_7$ is carbolower alkoxy or carboxy; $R_8$ is lower alkyl or mononuclear aralkyl; and $R_9$ is lower alkyl.

This invention also relates to 6-lower alkyl-1,2-dihydro-7,8-dioxo-1H-pyrrolo[1,2-α]indoles.

The pyrrolo[1,2-α]indole system is obtained by condensation of a 1-unsubstituted-2-carbalkoxyindole (I) with an α,β-unsaturated carbonyl or nitrile derivative, such as an alkyl acrylate, acrylonitrile, or acrylamide in the presence of a basic catalyst, such as trimethylbenzyl ammonium hydroxide or potassium t-butoxide. When this condensation is carried out in the presence of water the product is usually the 1-(β-substituted ethyl)-2-carbalkoxyindole (II). This derivative can then undergo a Dieckman cyclization (base-catalysis) to give the pyrrolo[1,2-α]indole system (III). When the addition reaction is carried out in an non-aqeuous solvent, such as benzene, the pyrroloindole β-keto ester, nitrile or amide is usually obtained directly in one operation. The β-keto ester, on heating with acid, preferably 95% acetic acid, will undergo decarbalkoxylation to a 1-ketopyrrolo [1,2-α]indole (VI). An alternate procedure to the pyrrolo[1,2-α]indole system involves treatment of a 2-carboxy-1-(β-carboxyethyl) indole (IIa) with hot acetic anhydride in the presence of potassium cyanide followed by treatment with dilute base, e.g. 5% ethanolic potassium hydroxide solution. This procedure affords a 1-ketopyrrolo[1,2,-α]indole (VI) directly. The β-keto nitrile or β-keto amide (III) on reduction with lithium borohydride affords the corresponding β-hydroxy derivative (VII). Heating the β-hydroxyamide with hydrazine hydrate gives the β-hydroxy acid hydrazide (VIIa).

Bromination of a 7-aralkoxy or 7-alkoxy 1-ketopyrrolo [1,2-α]indole (VI), preferably in acetic acid in the presence of hydrobromic acid with one molar equivalent of bromine, preferentially affords the 9-bromo derivative (V); with two molar equivalents of bromine the 2,9-dibromo derivative (IV) is obtained. Heating the 9-bromo derivative (V) with cuprous cyanide in dimethylformamide solution gives the 9-cyano derivative (IX). Treatment of VI with nitrous acid preferentially gives the 9-nitroso derivative (XLVI).

For the preferential preparation of a 2-bromo derivative (XIII) the ketone (VI) is first converted to an enamine (XIV), for example, by heating in benzene solution with a secondary amine such as pyrrolidine in the presence of an acid catalyst such as p-toluenesulfonic acid. Treatment of the enamine (XIV) with N-bromacetamide affords the 2-bromoketone (XIII). The 2-bromoketone may undergo further transformations. Thus, for example, treatment with sodium acetate affords the 2-acetoxyketone (XVI) and reduction with sodium borohydride affords the bromohydrin (VIII, XII). The bromine atom of the bromohydrin will undergo displacement reactions. Thus, on treatment with sodium azide the 2-azido-1-hydroxy derivative is formed (XII→XIIa).

The 1-keto function may be reduced to a methylene group by the Wolf-Kishner procedure (VI→XXVIII, IX→XLV) and to an alcohol by treatment with a metal hydride such as sodium borohydride or lithium borohydride (e.g. III→VII, IV→VIII, IX→X, XIII→XII, VI→XXIX, XVI→XVIa). Acylation of the resulting 1-hydroxypyrroloindole affords the corresponding ester (XXIX→XXX) which may be hydrolized to reform the free alcohol (XXX→XXIX, XXVII→XXVI). The 1-hydroxy group may also be oxidized to a keto function (XXVI→XXV). A useful reagent for this purpose is a solution of chromic oxide in pyridine.

The enamine (XIV) which was noted above, will undergo hydrogenation in the presence of a catalyst such as palladium on carbon or platinum in a solvent such as ethyl acetate to give the 1-aminopyrroloindole—with a pyrrolidine enamine a 1-pyrrolidino derivative is obtained. When this hydrogenation is carried out with a palladium catalyst and a derivative containing the 7-benzyloxy group the 7-hydroxy-1-amino derivative is obtained (XIV→XV). When platinum is used as a catalyst, a preferential hydrogenation of the enamine function occurs and the 7-benzyloxy-1-amino derivative is obtained (XIV→XVIII). The 1-tertiary aminopyrroloindoles may be converted to quaternary salts, for example the treatment of 1-pyrrolidino derivatives with methyl iodide (XV→XIX, XVIII→XVII). When the quaternary salt is heated with sodium azide the 1-azido derivative (XXI) is obtained.

The keto pyrroloindole may also be converted to the corresponding oxime (XXXII, XVIb), O-sulfonyl (XXXVIa) and O-alkyl (XXXVIb) oximes, hydrazone (XXXI) and substituted hydrazone, such as semicarbazone (XXXIII) and N-tosylhydrazone (XXXIV) by the usual procedures. It is possible to preferentially oximate the 9-formyl group of a 9-formyl-1-ketopyrroloindole (XXV) to give a 9-aldoxime (XXIIIb); bis-oximation is also possible (→XXIIIc).

Pyrroloindoles with certain substituents at the 9-position can be prepared via electrophilic substitution, e.g. bromination, nitrosation or formylation, of a 9-unsubstituted-pyrrolo[1,2-α]indole (XVIII→XX, XXVIII→XXIV, XXX→XXVII)

Bromination and nitrosation are discussed above. The preferred procedure for formylation involves treatment of the pyrroloindole with phosphorus oxychloride and dimethylformamide or N-methylformanilide. The resulting 9-formyl derivative may undergo further transformations. Thus, the formyl group can be reduced with sodium borohydride to a 9-hydroxymethyl derivative (XXII) which may be esterified or converted to a mixed carbonic ester, as for example, on treatment with phenylchloroformate to give the phenoxycarbonyloxymethyl derivative (XXIIIa). Treatment of this latter derivative with ammonia affords the corresponding carbamate. The 9-nitroso and 9-bromo derivatives also may undergo further transformations. Thus treatment of a 9-bromide with cuprous cyanide in refluxing dimethylformamide gives a 9-cyano derivative (V→IX). 9-cyano derivatives may also be obtained from 9-formyl derivatives by treatment with O,N-bis-trifluoroacetylhydroxylamine (XXIV→XLV).

1-keto-9-formyl derivatives (XXV) may be prepared by preferential oxidation with chromic oxide in pyridine of the 1-hydroxy group in 1-hydroxy-9-formyl derivatives (XXVI).

Using the appropriately 5- and 6-substituted indole 2-carbalkoxy derivative affords the corresponding 6- and 7-substituted pyrroloindole. The 7-hydroxy derivative are obtained by hydrogenolysis of the 7-benzyloxy group (XIV→XV) or by treatment of a 7-methoxy derivative with aluminum chloride in a refluxing inert solvent such as xylene, (XXVIII→XXXV, VI→XXXVII). The 7,8-ortho quinones (XXXVI, XXXVIII) are prepared by treating appropriate 7-hydroxy derivatives (XXXV, XXXVII) with potassium nitroso disulfonate (Fremy's salt). Treatment of a 7,8-ortho quinone (XLI) with acetic anhydride in the presence of boron trifluoride etherate affords the 5,7,8-triacetoxy derivative (XLIV), mild hydrolysis of which gives the 5,7,8-triol (XLIII) air oxidation of which furnishes the 7-hydroxy-5,8-para-quinone (XLII). The 7-hydroxy-5,8-para-quinones (XXXIX) are also obtained from the aforementioned 7,8-ortho-quinones by treatment with dilute acid or base, for example, 0.1 N hydrochloric acid for ten days at room temperature.

The following series of equations illustrates the above-discussed transformations. In the formulae, $R_1$=alkyl and aralkyl, $R_2$=hydrogen, alkyl, $R_3$=alkyl and $R_4$=alkyl.

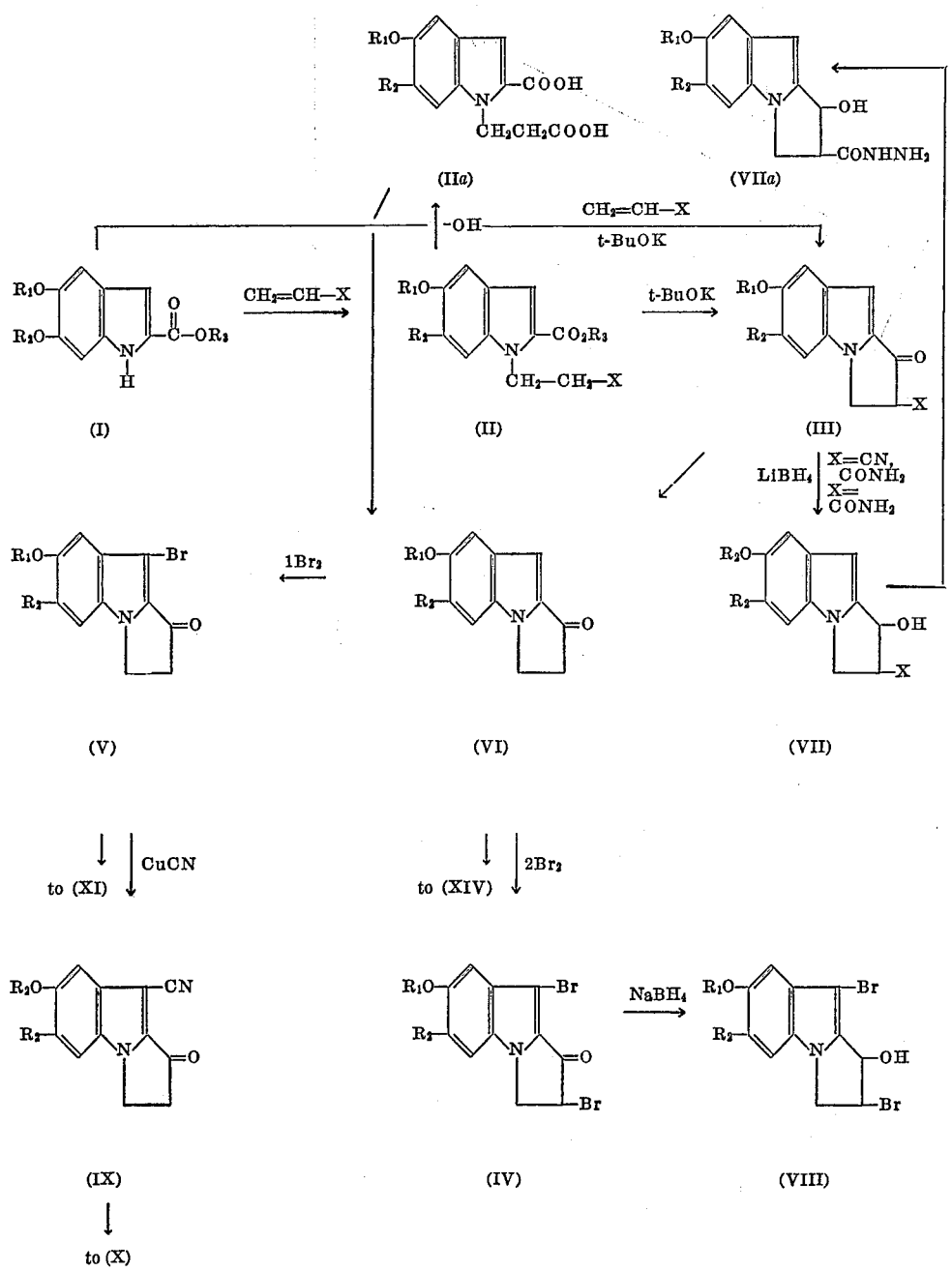

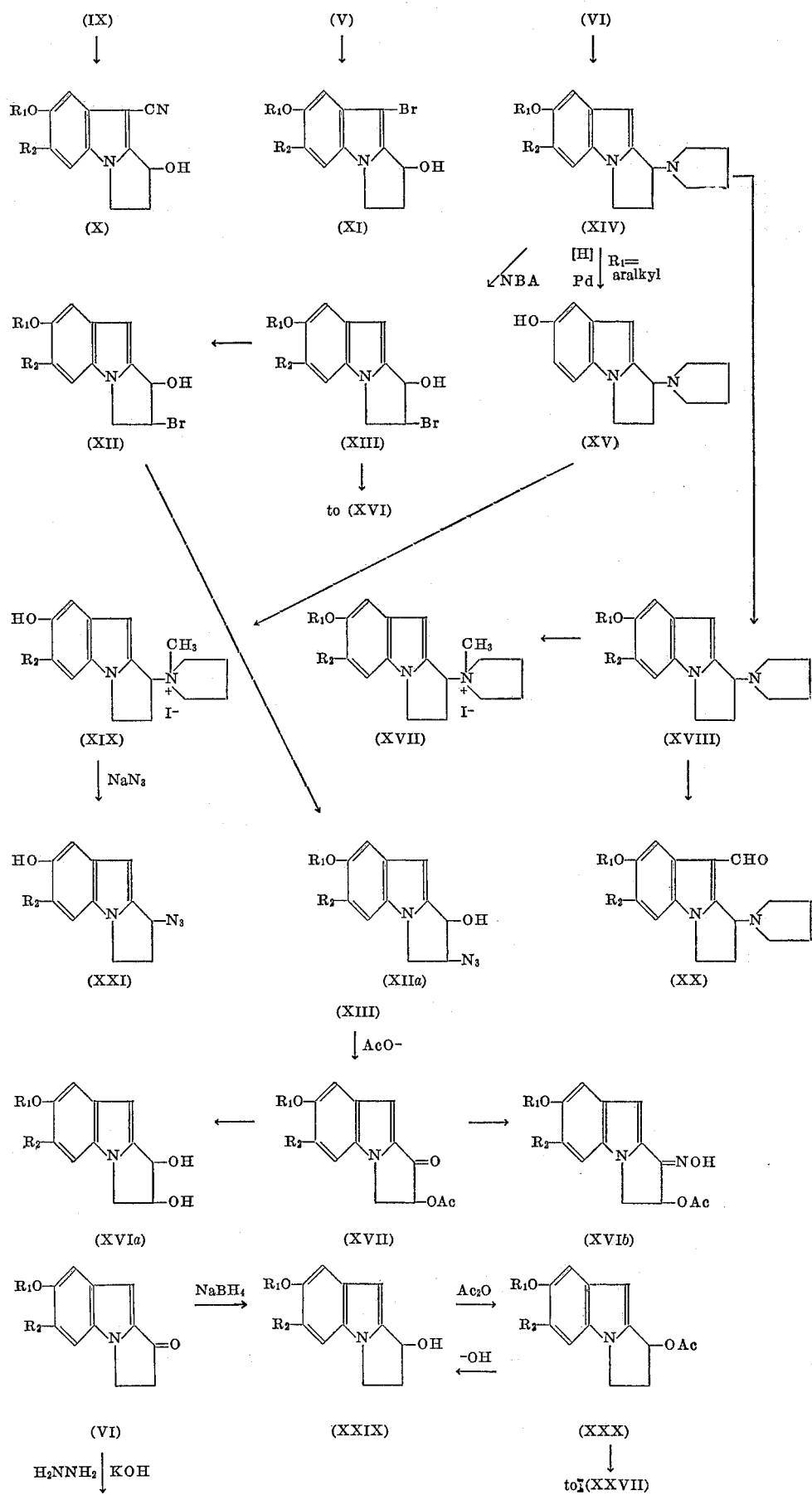

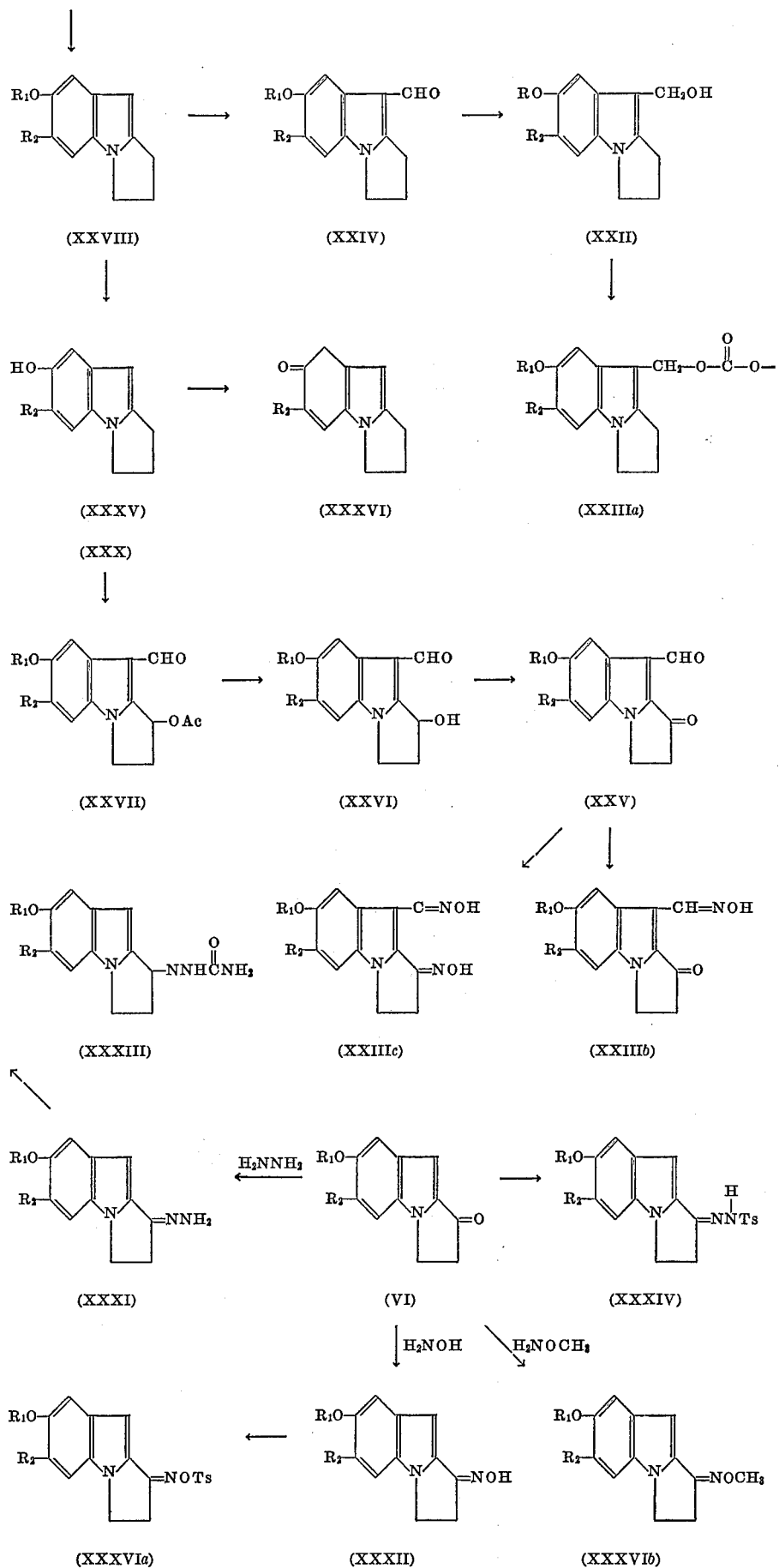

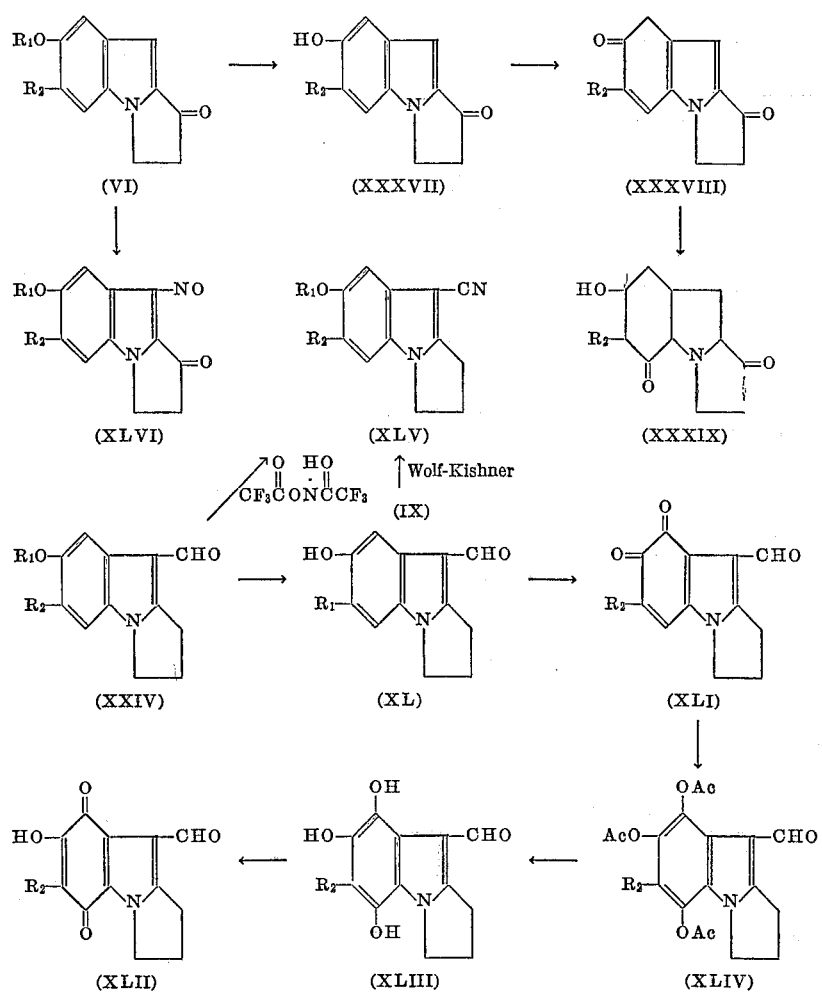

This invention is further illustrated in conjunction with the following specific examples. These examples describe the preparation of the following compounds:

EXAMPLES

1. Dimethyl-4-nitroanisole
2. 4-benzyloxy-2,5-dimethylnitrobenzene
3. 5-methoxy-4-methyl-2-nitrophenylpyruvic acid
4. 5-methoxy-4-methyl-2-nitrophenylpyruvic acid.

Using potassium ethoxide:

5. Ethyl 5-benzyloxy-4-methyl-2-nitrophenylpyruvate
6. 5-methoxy-6-methyl-2-indolecarboxylic acid
7. Methyl 5-methoxy-6-methyl-2-indolecarboxylate
8. Ethyl 5-benzyloxy-6-methyl-2-indolecarboxylate
9. Methyl 1-(β-cyanoethyl)-5-methoxy-6-methyl-2-indolecarboxylate
10. 2,3-dihydro-7-methoxy-6-methyl-1-oxo-1H-pyrrolo[1,2-α]indole-2-carbonitrile
11. 2,3-dihydro-7-methoxy-6-methyl-1-oxo-1H-pyrrolo[1,2α]indole-2-carbonitrile
12. Methyl 2,3-dihydro-7-methoxy-6-methyl-1-oxo-1H-pyrrolo[1,2-α]indole-2-carboxylate
13. Condensation of ethyl 5-benzyloxy-2-indolecarboxylate with ethyl acrylate
14. Methyl and ethyl ester of 7-benzyloxy-2,3-dihydro-6-methyl-1-oxo-1H-pyrrolo[1,2-α]indole-2-carboxylic acid
15. 2,3-dihydro-7-methoxy-6-methyl-1-oxo-1H-pyrrolo[1,2-α]indole
16. 2,3-dihydro-7-methoxy-6-methyl-1-oxo-1H-pyrrolo[1,2-α]indole
17. 7-benzyloxy-2,3-dihydro-1-oxo-1H-pyrrolo[1,2-α]indole
18. 7-benzyloxy-2,3-dihydro-1-oxo-1H-pyrrolo[1,2-α]indole
19. 7-benzyloxy-6-methyl-1-oxo-1H-pyrrolo-[1,2-α]indole
20. 9-bromo-2,3-dihydro-7-methoxy-6-methyl-1-oxo-1H-pyrrolo[1,2-α]indole
21. 7-benzyloxy-9-bromo-2,3-dihydro-1-oxo-1H-pyrrolo[1,2-α]indole
22. 2,3-dihydro-7-methoxy-6-methyl-1-oxo-1H-pyrrolo[1,2-α]indole-9-carbonitrile
23. 2,9-dibromo-2,3-dihydro-7-methoxy-6-methyl-1-oxo-1H-pyrrolo[1,2-α]indole
24. 7-benzyloxy-2-bromo-2,3-dihydro-1-oxo-1H-pyrrolo[1,2-α]indole
25. 2,3-dihydro-7-methoxy-6-methyl-1H-pyrrolo[1,2-α]indole
26. 7-benzyloxy-2,3-dihydro-1H-pyrrolo[1,2-α]indole
27. 2,3-dihydro-1-hydroxy-7-methoxy-6-methyl-1H-pyrrolo[1,2-α]indole
28. 7-benzyloxy-2,3-dihydro-1-hydroxy-1H-pyrrolo[1,2-α]indole
29. 2,3-dihydro-1-hydroxy-7-methoxy-6-methyl-1H-pyrrolo[1,2-α]indole-2-carbonitrile
30. 9-bromo-2,3-dihydro-1-hydroxy-7-methoxy-6-methyl-1H-pyrrolo[1,2-α]indole
31. 7-benzyloxy-9-bromo-2,3-dihydro-1-hydroxy-1H-pyrrolo[1,2-α]indole
32. 9-cyano-2,3-dihydro-1-hydroxy-7-methoxy-6-methyl-1H-pyrrolo[1,2-α]indole
33. 2,9-dibromo-2,3-dihydro-1-hydroxy-7-methoxy-6-methyl-1H-pyrrolo[1,2-α]indole
34. 7-benzyloxy-2-bromo-2,3-dihydro-1-hydroxy-1H-pyrrolo[1,2-α]indole 35. 1-acetoxy-7-benzyloxy-2,3-dihydro-1H-pyrrolo[1,2-α]indole
36. 7-benzyloxy-1-(N-pyrrolidino)-3H-pyrrolo[1,2-α]indole
37. 2,3-dihydro-7-hydroxy-1-(N-pyrrolidino)-1H-pyrrolo[1,2-α]indole
38. 7-benzyloxy-2,3-dihydro-1-(N-pyrrolidino)-1H-pyrrolo[1,2-α]indole
39. 1-(2,3-dihydro-7-hydroxy-1H-pyrrolo[1,2-α]indol-1-yl)-1-methylpyrrolidinium iodide
40. 1-(7-benzyloxy-2,3-dihydro-1H-pyrrolo[1,2-α]indol-1-yl)-1-methylpyrrolidinium iodide
41. 1-azido-2,3-dihydro-7-hydroxy-1H-pyrrolo[1,2-α]indole
42. 7-benzyloxy-2,3-dihydro-1-oxo-1H-pyrrolo[1,2-α]indole oxime
43. 2,3-dihydro-7-methoxy-6-methyl-1-oxo-1H-pyrrolo[1,2-α]indole hydrazone
44. 2,3-dihydro-7-methoxy-6-methyl-1-oxo-1H-pyrrolo[1,2-α]indole semicarbazone
45. 7-benzyloxy-2,3-dihydro-1-oxo-1H-pyrrolo[1,2-α]indole p-toluenesulfonylhydrazone
46. 1-acetoxy-7-benzyloxy-9-formyl-2,3-dihydro-1H-pyrrolo[1,2-α]indole
47. 7-benzyloxy-9-formyl-2,3-dihydro-1-hydroxy-1H-pyrrolo[1,2-α]indole
48. 7-benzyloxy-9-formyl-2,3-dihydro-1-oxo-1H-pyrrolo[1,2-α]indole
49. 7-benzyloxy-2,3-dihydro-1-(N-pyrrolidino)-1H-pyrrolo[1,2-α]indole-9-carboxaldehyde
50. 2,3-dihydro-9-formyl-7-methoxy-6-methyl-1H-pyrrolo[1,2-α]indole
51. 7-benzyloxy-9-formyl-2,3-dihydro-1H-pyrrolo[1,2-α]indole
52. 2,3-dihydro-9-hydroxymethyl-7-hydroxy-6-methyl-1H-pyrrolo[1,2-α]indole
53. 2,3-dihydro-9-hydroxymethyl-7-methoxy-6-methyl-1H-pyrrolo[1,2-α]indole
54. 2,3-dihydro-9-phenoxycarbonyloxy-7-methoxy-6-methyl-1H-pyrrolo[1,2-α]indole
55. 2,3-dihydro-9-formyl-7-hydroxy-6-methyl-1H-pyrrolo[1,2-α]indole
56. 2,3-dihydro-7-hydroxy-6-methyl-1-oxo-1H-pyrrolo[1,2-α]indole
57. 9-formyl-2,3-dihydro-7,8-dioxo-6-methyl-1H-pyrrolo[1,2-α]indole
58. 2,3-dihydro-6-methyl-1,7,8-trioxo-1H-pyrrolo[1,2-α]indole
59. 2,3-dihydro-7-hydroxy-6-methyl-1,5,8-trioxo-1H-pyrrolo[1,2-α]indole
60. 7-benzyloxy-2,3-dihydro-1-oxo-1H-pyrrolo[1,2-α]indole-2-carboxamide
61. 7-benzyloxy-2,3-dihydro-1-hydroxy-1H-pyrrolo[1,2-α]indole-2-carboxamide
62. 7-benzyloxy-2,3-dihydro-hydroxy-1H-pyrrolo[1,2-α]indole-2-carboxylic acid hydrazide
63. 9-bromo-2,3-dihydro-7-methoxy-6-methyl-1H-pyrrolo[1,2-α]indole
64. 2,3-dihydro-7-methoxy-6-methyl-1H-pyrrolo[1,2-α]indole-9-carbonitrile
65. 2,3-dihydro-7-methoxy-6-methyl-1H-pyrrolo[1,2-α]indole-9-carbonitrile
66. 2,3-dihydro-7-methoxy-6-methyl-9-nitroso-1-oxo-1H-pyrrolo[1,2-α]indole
67. 2-acetoxy-7-benzyloxy-2,3-dihydro-1-oxo-1H-pyrrolo[1,2-α]indole
68. 7-benzyloxy-2,3-dihydro-1,2-dihydroxy-1H-pyrrolo[1,2-α]indole
69. 2,3-dihydro-9-formyl-6-methyl-5,7,8-triacetoxy-1H-pyrrolo[1,2-α]indole
70. 2,3-dihydro-9-formyl-6-methyl-5,7,8-trihydroxy-1H-pyrrolo[1,2-α]indole and 2,3-dihydro-9-formyl-7-hydroxy-6-methyl-5,8-dioxo-1H-pyrrolo[1,2-α]indole
71. 7-benzyloxy-2-cyano-2,3-dihydro-1-oxo-1H-pyrrolo[1,2-α]indole
72. 7-benzyloxy-2-cyano-2,3-dihydro-1-hydroxy-1H-pyrrolo[1,2-α]indole
73. 7-benzyloxy-2,3-dihydro-9-isonitrosomethyl-1-oxo-1H-pyrrolo[1,2-α]indole
74. 7-benzyloxy-2,3-dihydro-9-isonitrosomethyl-1-oximino-1H-pyrrolo[1,2-α]indole
75. 2-acetoxy-benzyloxy-2,3-dihydro-1H-pyrrolo[1,2-α]indole-1-oxime
76. 7-benzyloxy-2,3-dihydro-1-oxo-1H-pyrrolo[1,2-α]indole-1-oxime p-toluenesulfonate
77. 7-benzyloxy-2,3-dihydro-1H-pyrrolo[1,2-α]indole-1-methyloxime
78. 2-carboxy-1-(β-carboxyethyl)-5-methoxy-6-methylindole
79. Methyl 2-carbomethoxy-5-methoxy-6-methyl-1-indolepropionate
80. 2-carboxy-1-(β-carboxyethyl)-5-methoxy-6-methylindole
81. 2,3-dihydro-7-methoxy-6-methyl-1-oxo-1H-pyrrolo[1,2-α]indole
82. Ethyl 5-benzyloxy-1-(β-carbethoxyethyl)-6-methyl-2-indolecarboxylate
83. Ethyl 7-benzyloxy-2,3-dihydro-6-methyl-1-oxo-1H-pyrrolo[1,2-α]indole-2-carboxylate
84. 2-azido-7-benzyloxy-2,3-dihydro-hydroxy-1H-pyrrolo[1,2-α]indole
85. 1,2-diacetoxy-7-benzyloxy-2,3-dihydro-1H-pyrrolo[1,2-α]indole

*Example 1*

A well stirred suspension of 16.7 g. (0.1 mole) of 2,5-dimethyl-4-nitrophenol (R. L. Datta and P. S. Varma, J. Am. Chem. Soc., 41, 2042 (1919)) in 50 ml. of water at 40–45° is treated alternately and in portions with a solution of 7.0 g. of sodium hydroxide in 18 ml. of water and 12 ml. of methyl sulfate. After 2 hrs. the mixture is filtered, and the solid is recrystallized from dilute methanol to give 14.5 g. (80%) of needles, M.P. 90–92°.

*Example 2*

2,5-dimethyl-4-nitrophenol (16.7 g., 0.1 mole) is added to a suspension of sodium methoxide (6.0 g.) in anhydrous t-butanol (75 ml.) with stirring. Benzyl chloride (12.7 g.) is added to the mixture followed by t-butanol (50 ml.). After 2 hrs. refluxing, the mixture contains orange solid and the pH is 9. An additional portion of benzylchloride (12.7 g.) is added and then methanol (90 ml.) which dissolves much of the solid. After 4 more hrs. of refluxing the pH is 6 and sodium methoxide (3.0 g.) is added and the mixture is refluxed and stirred overnight. Then the pH is 4–6 and sodium methoxide (3.0 g.) is again added. After 3 more hrs. of refluxing the mixture is cooled to give long yellow needles which are washed with 10% sodium hydroxide until the filtrate is clear. The alcohol filtrate is saved. An ether solution of the solid is washed with 10% sodium hydroxide (100 ml.), dried, and evaporated in vacuo, with the bath temperature maintained at 30–40°, to give 14.3 g. of residual solid.

The alcohol filtrate (above) is concentrated in vacuo to a mixture of oil and solid which is dissolved in ether. The ether solution is extracted with 14 100 ml. portions of 10% sodium hydroxide until the aqueous layer is colorless. The ether layer is dried and concentrated in vacuo to a dark brown oil containing a solid. After refrigeration the solid is filtered and washed with hexane to give 5.5 g. of light orange solid. No additional solid is obtained by treating the filtrate with hexane. The solid recrystallizes from boilinig hexane (350 ml., charcoal) to give light yellow solid (18.3 g.) (92.19%), M.P. 86–87°.

*Example 3*

Potassium t-butoxide is prepared by allowing 9.80 g. (0.25 g. atom) of potassium to react with 200 ml. of t-butyl alcohol. The excess alcohol is removed by distillation. Benzene (100 ml.) is added and removed in the same manner twice. The base is slurried in 200 ml.

benzene and 42.80 g. of ethyl oxalate is added with mechanical stirring. A solution of 45.25 g. (0.25 mole) of 2,5-dimethyl-4-nitroanisole (Example 1) in 600 ml. of benzene is distilled until the boiling point is 80°; the residual solution is cooled to room temperature and added to the stirred reaction solution. Within minutes a deep red solid separates; the mixture is mechanically stirred at reflux temperature for 24 hrs. and then at room temperature for 63 hrs. The mixture is filtered and the residue is washed with ether and air-dried. The powder is dissolved in about 1 liter of water, treated with about 40 g. of sodium bicarbonate and heated on the steam bath for 30 min. Acidification of the solution with hydrochloric acid gives 45.6 g. (72%) of crystals, M.P. 106–108°.

Example 4

Ethanol (6.25 ml.) is added to a mechanically stirred slurry of 2.15 g. (0.055 g. atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl 4-nitroanisole (Example 1) in 150 ml. of ether. A red solid separates immediately and the mixture is mechanically stirred at room temperature for 18 hrs. and then at reflux temperature for 4 hrs. The mixture is filtered, and the solid is washed with ether. The residue is dissolved in water and the solution is heated on the steam bath for 30 min. The solution is cooled and extracted with ether. The aqueous solution is acidified with hydrochloric acid and filtered to give 6.123 g. (49%) of crystals, M.P. 167–170°.

From the ether extracts there is recovered 3.11 g. (34%) of starting material.

Example 5

Freshly distilled ethyloxalate (32.64 g., .223 mole) is slowly added to a fine suspension of freshly prepared potassium t-butoxide (25.26 g., 0.233 mole) in dry benzene (150 ml.) to give a yellow solution which clears completely on warming. A benzene solution (150 ml.) of 4-benzyloxy-2,5-dimethyl-nitrobenzene (Example 2) (28.71 g., .1116 mole) is rapidly added to the mixture and a deep red precipitate forms immediately. The mixture is stirred at reflux for 2½ hrs. and then it is cooled, filtered, and pressed dry. The benzene filtrate is reserved. The solid is washed several times with anhydrous ether, until the filtrate is colorless, to give a bright scarlet powder. The potassium salt is dissolved in glacial acetic acid (150 ml.) and on cooling a pale yellow solid is obtained from the solution which is washed with water until the pH of the filtrate is 6–7. After drying in vacuo at 50–60° for 1 hr., 0.89 g. (75%) of the pale yellow ester, M.P. 88–90°, is obtained. Recrystallization from 40% benzene–60% hexane (charcoal) gives a nearly colorless solid, M.P. 90–92°.

Example 6

A solution of 42.0 (0.166 mole) of 5-methoxy-4-methyl-2-nitrophenylpyruvic acid (Example 3) in 230 ml. of 17% ammonium hydroxide and 115 ml. of water is treated with a hot solution containing 300 g. of ferrous sulfate heptahydrate in 340 ml. of water. The mixture is mechanically stirred at steam-bath temperature for 1 hr. and then allowed to cool to room temperature and filtered.

The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° (gas evolution).

Example 7

A solution of 38.7 g. (0.188 mole) of 5-methoxy-6-methyl-2-indolecarboxylic acid (Example 6) and 1000 ml. of methanolic hydrogen chloride is heated at reflux temperature for 3 hrs. The solvent is removed under reduced pressure, and the residue is dissolved in about 1 liter of ether. This solution is treated with activated carbon, the mixture is filtered and the filtrate is taken to dryness. Recrystallization of the residue from dilute methanol gives in two crops 38.6 g. of white needles, M.P. 149–150°.

Example 8

Pale yellow ethyl 5-benzyloxy-4-methyl-2-nitrophenylpyruvate (Example 5) (5.0 g., .024 mole), M.P. 88–90°, is dissolved in boiling glacial acetic acid (60 ml.) to give a light yellow-brown solution. Zinc dust (20 g.) is added slowly over a 5 min. period and the mixture turns dark brown. After 5 min. boiling the color lightens to a red-brown color and the mixture is boiled for an additional 10 min. and then filtered while hot. A pale yellow-amber crystalline solid (1.98 g., 46%), M.P. 110–138°, is obtained by careful dilution of the filtrate with an equal volume of water. Additional product is obtained by further dilution of the mother liquor.

The crude solid is dissolved in anhydrous ether and separated from any insoluble material by filtration. The ether solution is chromatographed on Merck reagent grade alumina in a 30 mm. column. The ether eluant is evaporated to give a yellow-white solid which on recrystallization from acetone Skellysolve B gives pale needles, M.P. 143–144°.

Example 9

A solution of 0.860 g. (3.92 mmoles) of methyl 5-methoxy-6-methyl-2-indolecarboxylate (Example 7) and 0.212 g. (4.0 mmoles) of acrylonitrile in 15 ml. of dioxane containing 0.5 ml. of 35% aqueous benzyl trimethyl ammonium hydroxide is heated at 50° with magnetic stirring for 30 min. The solution is then allowed to stand at room temperature for 16 hrs., diluted with water containing acetic acid and extracted with chloroform. The extract is dried over magnesium sulfate and taken to dryness. Crystallization of the residual gum from methanol gives 0.500 g. (48%) of white crystals, M.P. 99–101°. Two recrystallizations from dilute methanol furnishes white rods, M.P. 119–121°;

$\lambda_{max}^{CH_3OH}$ 301 m$\mu$ ($\epsilon$=22,100); $\lambda_{max}^{KBr}$ 4.45 5.86, 6.57, 7.95 8.20, 8.30$\mu$

Example 10

Potassium t-butoxide is prepared in the usual manner from 0.223 g. (5.7 mg. atoms) of potassium and 25 ml. of t-butyl alcohol. A mechanically-stirred suspension of the base in 25 ml. of benzene is treated with a solution of 1.550 g. (5.7 mmoles) of methyl 1-($\beta$-cyanoethyl)-5-methoxy-6-methyl-2-indolecarboxylate (Example 9) in 50 ml. of benzene. The resulting mixture is stirred at reflux temperature for 24 hrs. and then at room temperature for 16 hrs. The mixture is treated with cracked ice and acidified with dilute hydrochloric acid solution. After distribution of the reaction mixture between methylene chloride and additional water, the organic layer is dried over magnesium sulfate and taken to dryness. The residue is recrystallized from methanol to give 0.917 g. (67%) of crystals, M.P. 215–219°. Several recrystallizations from methanol gives needles, M.P. 219–221°;

$\lambda_{max}^{CH_3OH}$ 336 m$\mu$ ($\epsilon$=21,800); $\lambda_{max}^{KBr}$ 4.44, 5.75, 6.50, 8.26$\mu$

Example 11

To a suspension of potassium t-butoxide, prepared from 0.880 g. (22.5 mg. atoms) of potassium and 50 ml. of t-butyl alcohol, in 50 ml. of benzene is added, with mechanical stirring, a solution of 4.923 g. (225 mmoles) of methyl 5-methoxy - 6 - methyl-2-indolecarboxylate Example 7) in 150 ml. of benzene and then 1.190 g. (22.5 mmoles, 1.47 ml.) of acrylonitrile. The resulting mixture is heated at reflux temperature for 6 hrs., acidified with 5% hydrochloric acid solution and extracted with methylene chloride. The combined organic extracts are dried over magnesium sulfate and taken to dryness. The residue is recrystallized twice from methanol to give 1.35 g. (25%) of crystals, M.P. 215–218°.

*Example 12*

A mechanically stirred suspension of potassium t-butoxide (prepared from 0.391 g., 10 mg.-atoms of potassium and 25 ml. of t-butyl alcohol) in 25 ml. of benzene is treated with a solution of 2.190 g. (10 mmoles) of methyl 5 - methoxy-6-methyl-2-indolecarboxylate (Example 7) in 50 ml. of benzene followed by 0.860 g. (10 mmoles, 0.89 ml.) of methyl acrylate. The mixture is heated at reflux temperature for 2 hrs. and then stirred at room temperature for 63 hrs. The reaction is diluted with water, acidified with hydrochloric acid solution and extracted with methylene chloride. The organic solution is dried over magnesium sulfate and taken to dryness. The residue is triturated with methanol and filtered to give 1.725 g. (63%) of near white crystals, M.P. 175–179°. Two recrystallizations from acetone-petroleum ether (B.P. 60–70°) give needles, M.P. 180–182°;

$\lambda_{max.}^{CH_3OH}$ 336 m$\mu$ ($\epsilon$=21,000); $\lambda_{max.}^{KBr}$ 5.78, 6.52, 8.04, 8.25, 8.56$\mu$

*Example 13*

A mechanically stirred mixture of 100 g. (0.342 mole) of ethyl 5-benzyloxy-2-indolecarboxylate, 38.3 g. (0.342 mole) of potassium t-butoxide and 29.5 g. (0.342 mole, 30.6 ml.) of methyl acrylate in 2300 ml. of benzene is heated at reflux temperature for 4 days. The cooled mixture is acidified with dilute hydrochloric acid solution, whereupon all solid dissolved. The aqueous layer is extracted with methylene chloride, and the dried combined organic layers are concentrated. As a quantity of solid sufficient enough to cause bumping separates, it is removed by filtration and concentration of the filtrate is continued. In this manner the following six fractions are obtained: (a) 39.7 g. of ethyl 7-benzyloxy-2,3-dihydro-1-oxo-1H-pyrrolo[1,2-α]indole-2-carboxylic, M.P. 160–164°; (b) 15.4 g. of methyl 7-benzyloxy-2,3-dihydro-1-oxo-1H-pyrrolo[1,2-α]indole-2-carboxylate, M.P. 142–145°; (c) 2.0 g. of methyl ester, M.P. 142–145°; (d) 7.5 g. of starting indole ester, M.P. 160–162°; (e) 3.4 g. of methyl ester, M.P. 142–145°; and (f) 5.5 g. of starting indole ester. These amounts represent a 33% yield of ethyl ester, an 18% yield of methyl ester and a 13% recovery of starting indole ester.

The ethyl ester is recrystallized three times from ethanol to give white plates, M.P. 151–153°;

$\lambda_{max.}^{CH_3OH}$ 325 m$\mu$ ($\epsilon$=23,000); $\lambda_{max.}^{HCl}$ 330 m$\mu$ ($\epsilon$=24,100);

$\lambda_{max.}^{NaOH}$ 356 m$\mu$ ($\epsilon$=26,500); $\lambda_{max.}^{KBr}$ 5.71, 5.84, 6.15, 6.50, 8.35$\mu$ A sample of methyl ester is recrystallized two times from methanol to give shining plates, M.P. 140–142°;

$\lambda_{max.}^{CH_3OH}$ 325 m$\mu$ ($\epsilon$=22,000); $\lambda_{max.}^{NaOH}$ 356 m$\mu$ ($\epsilon$=26,400);

$\lambda_{max.}^{KBr}$ 5.69, 5.84, 6.14, 6.48, 8.30–8.35$\mu$

*Example 14*

A mixture of the methyl and ethyl ester is prepared by reacting freshly prepared potassium t-butoxide, ethyl 5-benzyloxy-6-methyl-2-indolecarboxylate and methylacrylate in dry benzene according to the procedure described in Example 12 for the analogous 7-methoxy compound. The reaction mixture is refluxed for 3½–4 days and then it is acidified and extracted with methylene chloride. After drying, the organic layer is concentrated in vacuo to a solid which on trituration with methanol gives white needles, M.P. 149–153° (methanol), $\lambda_{max.}^{CH_3OH}$ 335 m$\mu$; $\lambda_{max.}^{KBr}$ 5.72, 5.86, 8.35$\mu$ positive ferric chloride enol test.

*Example 15*

A mixture of 3.00 g. (11 mmoles) of methyl 2,3-dihydro-7 - methoxy - 6 - methyl-1-oxo-1H-pyrrolo[1,2,-α]indole-2-carboxylate (Example 12), 120 ml. of methanol and 30 ml. of 37% hydrochloric acid solution is heated at reflux temperature for 1 hr. The solid dissolves during this period, and the resulting green solution is poured into much water and extracted with methylene chloride. The extracts are washed with sodium bicarbonate solution, dried over magnesium sulfate and taken to dryness. The residue is slurried with 50 ml. of ether and filtered to give 1.462 g. of tan solid, M.P. 204–208°. This material is recrystallized from acetone-petroleum ether (B.P. 60–70°) to give 1.000 g. (42%) of yellow crystals, M.P. 211–213°. Two additional recrystallizations from acetone gives yellow crystals, M.P. 213–215°;

$\lambda_{max.}^{CH_3OH}$ 331 m$\mu$ ($\epsilon$=21,000); $\lambda_{max.}^{KBr}$ 5.82, 6.49, 8.21, 8.40$\mu$

*Example 16*

A solution of 37.7 g. (0.138 mole) of methyl 2,3-dihydro - 7-methoxy-6-methyl-1-oxo-1H-pyrrolo[1,2-α]indole-2-carboxylate (Example 12) in 800 ml. of 95% acetic acid is heated at reflux temperature for about 18 hrs. The solution is cooled and filtered to give 23.2 g. of crystals, M.P. 216–218°. The filtrate is diluted with much water, and the precipitated solid is recrystallized from methylene chloride-petroleum ether (B.P. 30–60°) to give 2.4 g. (86% total yield) of crystals, M.P. 210–215°.

*Example 17*

A mixture of 0.500 g. (1.5 mmoles) of methyl 7-benzyloxy - 2,3 - dihydro-1-oxo-1H-pyrrolo[1,2-α]indole-2-carboxylate (Example 13), 40 ml. of methanol and 10 ml. of 37% hydrochloric acid is heated at reflux for 1 hr. The product is isolated with methylene chloride and recrystallized from acetone-petroleum ether (B.P. 60–70°) to give 155 mg. (38%) of crystals, M.P. 181.0–183.5°. Three recrystallizations from the same solvent pair gives yellow plates, M.P. 183–184°;

$\lambda_{max.}^{CH_3OH}$ 320 m$\mu$ ($\epsilon$=20,500); $\lambda_{max.}^{KBr}$ 5.84, 5.90 (split carbonyl), 6.15, 6.48$\mu$

*Example 18*

A solution of 45.2 g. (0.13 mole) of ethyl 7-benzyloxy-2,3 - dihydro - 1 - oxo-1H-pyrrolo[1,2-α]indole-2-carboxylate (Example 13) and 20.8 g. (0.062 mole) of methyl 7-benzyloxy-2,3-dihydro-1-oxo-1H-pyrrolo[1,2-α]indole-2-carboxylate in 1600 ml. of 95% acetic acid is heated at reflux temperature for 16 hrs.; isolation of the product as described for the methoxy methyl ketone (Example 16) gives 45.0 g. (85% yield) of shiny plates, M.P. 186–188°.

*Example 19*

The previously described mixture of ethyl and methyl carboxylates (Example 14) is refluxed for 18 hrs. in 95% glacial acetic acid. A tan solid is collected from the dark brown solution on cooling and dilution with water in 70% yield, M.P. 197–199.5° (dec.);

$\lambda_{max.}^{CH_3OH}$ 331 m$\mu$; $\lambda_{max.}^{KBr}$ 5.87, 8.36$\mu$

*Example 20*

A mixture of 0.855 g. (3.97 mmoles) of 2,3-dihydro-7-methoxy - 6-methyl-1-oxo-1H-pyrrolo[1,2-α]indole (Examples 15, 16) and 100 ml. of acetic acid is heated on the steam bath until solution is effected. The solution is cooled to room temperature and treated with two drops of 48% hydrobromic acid solution. To this solution is added, with magnetic stirring, 5.4 ml. of 0.735 M bromine in acetic acid solution; the resulting solution immediately gives a negative starch-iodide test. The solution is chilled and slowly diluted with water until needles separate. Filtration gives 0.753 g. (64%) of tan needles of sufficient purity for further work. Several recrystallizations from acetone-petroleum ether (B.P. 60–70°) gives ivory-colored needles, M.P. 290°, but darkening from 125°;

$$\lambda_{max.}^{CH_3OH} \ 331 \ m\mu; \ \lambda_{max.}^{KBr} \ 5.90, \ 6.50\mu$$

Example 21

A magnetically stirred solution of 1.003 g. (3.61 mmoles) of 7-benzyloxy-2,3-dihydro-1-oxo-1H-pyrrolo[1,2-α]indole (Example 17) in 200 ml. of acetic acid is treated with 5.1 ml. of 0.71 M bromine in acetic acid. Within 1 min. the solution gives a negative starch-iodide test; it is then slowly diluted with 250 ml. of water and chilled. The solid is collected by filtration and recrystallized from acetone-petroleum ether (B.P. 60–70°) to give 0.733 g. (57% yield) of needles, M.P. 122–124° (dec.) after darkening from 100°;

$$\lambda_{max.}^{CH_3OH} \ 320 \ m\mu; \ \lambda_{max.}^{KBr} \ 5.85, \ 6.16, \ 6.46\mu$$

Example 22

A magnetically stirred mixture of 294 mg. (1.0 mmole) of 9-bromo-2,3-dihydro-7-methoxy-6-methyl-1-oxo-1H-pyrrolo[1,2-α]indole (Example 20) and 215 mg. (1.2 mmoles) of cuprous cyanide in 15 ml. of dimethylformamide is heated at reflux temperature for 4 hrs. The hot mixture is poured into a solution of 4.0 g. of ferric chloride in 7 ml. of water and 1 ml. of concentrated hydrochloric acid. This mixture is heated on the steambath for 20 min. and poured into water. The mixture is extracted thrice with benzene, and the combined organic layers are washed with 18% hydrochloric acid and then 10% sodium hydroxide. The organic solution is dried over magnesium sulfate and taken to dryness. The residue is crystallized from acetone-petroleum ether (B.P. 60–70°) to give 30 mg. of yellow needles, M.P. 226–228° (dec.);

$$\lambda_{max.}^{CH_3OH} \ 335 \ m\mu; \ \lambda_{max.}^{KBr} \ 4.50, \ 5.85, \ 6.12, \ 6.50\mu$$

Example 23

A solution of 0.500 g. (2.33 mmoles) of 2,3-dihydro-7-methoxy-6-methyl-1-oxo-1H-pyrrolo[1,2-α]indole (Examples 15, 16) in 50 ml. of acetic acid containing 2 drops of 48% hydrobromic acid is treated (magnetic stirring) with 6.45 ml. of 0.726 M bromine in acetic acid solution. After 5 min., the reaction solution gives a negative starch-iodide test. Dilution with water gives 0.601 g. (69%) of orange solid, M.P. 270°. One recrystallization from acetone-petroleum ether (B.P. 60–70°) gives material having $$\lambda_{max.}^{CH_3OH} \ 334 \ m\mu; \ \lambda_{max.}^{KBr} \ 5.85, \ 6.50\mu$$

Example 24

To a magnetically stirred suspension of 0.330 g. (1.0 mmole) of 7-benzyloxy-1-(N-pyrrolidino)-3H-pyrrolo[1,2-α]indole (Example 36) in 15 ml. of peroxide-free dioxane is added 0.156 g. (1.0 mmole) of N-bromacetamide. The mixture becomes dark, and all solid dissolved immediately. Within a few minutes the solution gives a negative starch-iodide test, and water containing a few drops of 48% hydrobromic acid is added until solid begins precipitating. The mixture is extracted with methylene chloride, and the dried organic solution is taken to dryness. Recrystallization of the residue from acetone-petroleum ether (B.P. 60–70°) and then from much methanol gives 0.120 g. (34% yield) of crystals, M.P. 187–188° (dec.);

$$\lambda_{max.}^{CH_3OH} \ 335 \ m\mu; \ \lambda_{max.}^{KBr} \ 5.80, \ 6.08, \ 6.44\mu$$

Example 25

A mixture of 2,3-dihydro-7-methoxy-6-methyl-1-oxo-1H-pyrrolo[1,2-α]indole (Examples 15, 16) (1.67 g.; 7.75 mmoles) and 99–100% hydrazine hydrate (0.8 ml.) in diethylene glycol (30 ml.) containing 85% potassium hydroxide (1.120 g.) is refluxed, with stirring, for 4 hrs. The reaction mixture is aged in the cold for 1 hr. and filtered to give 690 mg., of a grey solid, M.P. 115–124°. The filtrate is extracted with methylene chloride. The extract is dried over anhydrous sodium sulfate and taken to dryness. Crystallization of the residue from methanol gives 77 mg. of light yellow crystals, M.P. 116–121°, to give a total yield of 767 mg. (49%). Recrystallization from petroleum ether (30–60°) furnishes light yellow crystals, M.P. 116–118°;

$$\lambda_{max.}^{CH_3OH} \ 279, \ 295 \ (sh.), \ 308 \ (sh.) \ m\mu \ (\epsilon = 7930, \ 6930, \ 4620)$$

no carbonyl absorption in the infrared.

Example 26

A mixture of 831 mg. (3.0 mmoles) of 7-benzyloxy-2,3-dihydro-1-oxo-1H-pyrrolo[1,2-α]indole (Examples 17, 18), 0.4 ml. of hydrazine hydrate, 560 mg. of potassium hydroxide and 10 ml. of diethylene glycol is heated at reflux temperature for 4 hrs. The cooled mixture is poured into water and extracted with methylene chloride. The dried extract is evaporated, and the residue is dissolved in benzene and passed through a Florisil (a synthetic magnesium silicate) column. The solid in the first 50 ml. of benzene eluate is recrystallized from acetone-petroleum ether (B.P. 60–70°) to give 0.207 g. (27%) of white crystals, M.P. 147–150°. Three recrystallizations from methanol gives white crystals, M.P. 150–152°;

$$\lambda_{max.}^{CH_3OH} \ 278, \ 296 \ (sh.), \ 308 \ (sh.) \ m\mu \ (\epsilon = 8150; \ 6850; \ 3160)$$

no carbonyl absorption in the infrared.

Example 27

2,3-dihydro-7-methoxy-6-methyl-1-oxo-1H-pyrrolo[1,2-α]indole (Example 15, 16) (253 mg., 1.18 mmoles) is reduced with 90 mg. (2.37 mmoles) of sodium borohydride in the usual manner. Isolation of the product with methylene chloride and several recrystallizations from ether-petroleum ether (B.P. 60–70°) gives white crystals, M.P. 142–144;

$$\lambda_{max.}^{CH_3OH} \ 280, \ 297, \ (sh.), \ 308 \ (sh.) \ m\mu$$

no carbonyl absorption in the infrared.

Example 28

A mixture of 2.77 g. (10 mmoles) of 7-benzyloxy-2,3-dihydro-1-oxo-1H-pyrrolo[1,2-α]indole (Examples 17, 18) and 250 ml. of ethanol is heated to reflux temperature. The hot suspension is treated with 0.756 g. (20 mmoles) of sodium borohydride; all solid immediately dissolves. The solution is heated at reflux temperature for 2 min. and then left at room temperature for 1 hr. The solvent is removed, and the residue is distributed between 1% sodium hydroxide solution and methylene chloride. The organic layer is dried over magnesium sulfate and taken to dryness. The residue is recrystallized from acetone-petroleum ether (B.P. 60–70°) with the aid of activated charcoal to give 1.84 g. (66% yield) of crystals, M.P. 121–124°. Several recrystallizations from ether-petroleum ether (B.P. 60–70°) and then benzene-petroleum ether (B.P. 60–70°) gives needles, M.P. 122.0–123.5°;

$\lambda_{max.}^{CH_3OH}$ 278, 298 (sh.), 310 (sh.) m$\mu$ ($\epsilon$=10.700; 6,150 4,110); $\lambda_{max.}^{KBr}$ 2.98; 6.13, 6.33, 6.43, 8.50$\mu$

Example 29

To a magnetically stirred solution of 110 mg. (0.46 mmole) of 2,3-dihydro-7-methoxy-6-methyl-1-oxo-1H-pyrrolo[1,2-$\alpha$]indole-2-carbonitrile (Example 10) in 5 ml. of purified tetrahydrofuran is added 22 mg. (0.92 mmole) of lithium borohydride. The solution deposits a solid after 3 min., and the mixture is stirred at room temperature for 2 hrs. Acetic acid is added until hydrogen evolution ceases and then methanol is added. The resulting solution is taken to dryness, and the residue is distributed between methylene chloride and water. The organic extract is taken to dryness, and the residue is chromatographed on Florisil. The material eluted by methylene chloride is recrystallized from methylene chloride-petroleum ether (B.P. 60–70°) to give needles, M.P. 196–200°;

$\lambda_{max.}^{CH_3OH}$ 2.80, 4.40 no carbonyl absorption in the infrared.

Example 30

A solution of 9-bromo-2,3-dihydro-7-methoxy-6-methyl-1-oxo-1H-pyrrolo[1,2-$\alpha$]indole (Example 20) in methanol is reduced with excess sodium borohydride to give the alcohol, $\lambda_{max.}^{CH_3OH}$ 280, 296 (sh.), 308 (sh.) m$\mu$ no carbonyl absorption in the infrared.

Example 31

A mixture of 0.712 g. (2.0 mmoles) of 7-benzyloxy-9-bromo-2,3-dihydro-1-oxo-1H-pyrrolo[1,2-$\alpha$]indole (Example 21) in 50 ml. of ethanol is treated with 0.151 g. (4.0 mmoles) of sodium borohydride. The product is isolated in the usual manner to give white crystals which decompose above 80°;

$\lambda_{max.}^{CH_3OH}$ 2.9–3.1$\mu$ no carbonyl absorption in the infrared.

Example 32

A solution of 9-cyano-2,3-dihydro-7-methoxy-6-methyl-1H-pyrrolo[1,2-$\alpha$]indole (Example 22) in methanol is reduced with excess sodium borohydride to give the product, which has $\lambda_{max.}^{CH_3OH}$ 282, 296 (sh.), 307 (sh.) m$\mu$ no carbonyl absorption in the infrared.

Example 33

A slurry of 373 mg. (1.0 mmole) of 2,9-dibromo-2,3-dihydro-7-methoxy-6-methyl-1-oxo-1H-pyrrolo[1,2-$\alpha$]indole (Example 23) in 15 ml. of boiling methanol is treated with 76 mg. (2.0 mmole) of sodium borohydride; all solid dissolves immediately. The solution is kept at room temperature for 45 min. and then worked up in the usual way to give white crystals, $\lambda_{max.}^{CH_3OH}$ 285, 300 (sh.), 311 (sh.) m$\mu$ no carbonyl absorption in the infrared.

Example 34

A suspension of 356 mg. (1.0 mmole) of 7-benzyloxy-2-bromo-2,3-dihydro-1-oxo-1H-pyrrolo[1,2-$\alpha$]indole (Example 24) in 75 ml. of boiling ethanol is reduced with 76 mg. (2.0 mmole) of sodium borohydride in the usual manner. The product is isolated with methylene chloride and recrystallized from acetone-petroleum ether (B.P. 60–70°) to give white crystals, dec., above 121°;

$\lambda_{max.}^{CH_3OH}$ 278, 305 (sh.) m$\mu$; $\lambda_{max.}^{KBr}$ 2.78, 6.17, 6.36, 6.49$\mu$

Example 35

A solution of 1.97 g. (7.1 mmole) of 7-benzyloxy-2,3-dihydro-1-hydroxy-1H-pyrrolo[1,2-$\alpha$]indole (Example 28) in 25 ml. of acetic anhydride is treated with 1.15 g. (14 mmole) of sodium acetate and the resulting mixture is heated on a steam bath for 1.5 hr. After this mixture is cooled and poured onto ice it is stirred until all of the acetic anhydride is hydrolyzed and the crystalline acetate is present. This acetate is collected and washed well with water, dissolved in methylene chloride, washed two times with potassium bicarbonate solution, dried and concentrated as petroleum ether (60–70°) is added. Cooling affords 1-acetoxy-7-benzyloxy-2,3-dihydro-1H-pyrrolo[1,2-$\alpha$]indole, white plates, M.P. 104–106°;

$\lambda_{max.}^{KBr}$ 5.75 (s.), 8.0 (s.) $\mu$; $\lambda_{max.}^{CH_3OH}$ 220 ($\epsilon$=9,300), 302$\epsilon$ ($\epsilon$=4,300), 315 ($\epsilon$=2,900) m$\mu$ Further recrystallizing from acetone-petroleum ether (60–70°), gives material with M.P. 109°.

Example 36

A solution of 5.840 g. (20 mmoles) of 7-benzyloxy-2,3-dihydro-1-oxo-1H-pyrrolo[1,2-$\alpha$]indole (Examples 17, 18), 200 mg. of p-toluenesulfonic acid hydrate and 5.68 g. (80 mmoles, 6.7 ml.) of pyrrolidine in 250 ml. of benzene is heated at reflux temperature for 2 hrs., the water being collected in a modified Dean-Stark apparatus. The solvents are removed from the cooled solution, and the residue is slurried with methanol and filtered to give 5.930 g. (90%) of golden plates, M.P. 154–157° dec. A sample recrystallized three times from ethyl acetate gives golden plates, M.P. 151–154° (dec.), $\lambda_{max.}^{CH_3OH}$ 315, 342 m$\mu$ ($\epsilon$=14,100; 11,900); $\lambda_{max.}^{KBr}$ 6.15, 6.25, 6.35$\mu$

Example 37

A mixture of 5.500 g. (16.7 mmoles) of 7-benzyloxy-1-(N-pyrrolidino)-3H-pyrrolo[1,2-$\alpha$]indole (Example 36) and 1.00 g. of 10% palladium-on charcoal catalyst in 200 ml. of ethyl acetate is shaken under an atmosphere of hydrogen until no further pressure drop in the system is observed. The mixture is filtered, and the residue is washed with several portions of boiling acetone. The combined filtrate and washings are taken to dryness, and the solid residue is slurried with 50 ml. of acetone and collected by filtration to give 2.802 g. (70%) of needles M.P. 220–223° dec. Two recrystallizations from ethyl acetate furnishes white needles, M.P. 227–228°;

$\lambda_{max.}^{CH_3OH}$ 278, 302 (sh.), 312 (sh.) m$\mu$ ($\epsilon$=8970; 4380; 3640;) $\lambda_{max.}^{KBr}$ 3.34–3.80, 6.14, 6.30, 6.48

Example 38

A mixture of 0.660 g. (2.0 mmoles) of benzyloxy-1-(N-pyrrolidino)-3H-pyrrolo[1,2-$\alpha$]indole (Example 36) and 66 mg. of platinum oxide in 50 ml. of ethyl acetate is shaken under a hydrogen atmosphere. In 10 min. a pressure drop corresponding to a theoretical uptake of hydrogen is noted; no further pressure drop is noted in the subsequent 45 min. The mixture is filtered, and the filtrate is taken to dryness. The residue is crystallized from ether-petroleum ether (B.P. 60–70°) with the aid of activated charcoal to give, in two crops, 0.432 g. (65%) of crystals, M.P. 98–101°. Two recrystallizations from the same solvent pair gave needles, M.P. 101.0–102.5°;

$\lambda_{max.}^{CH_3OH}$ 278, 297 (sh.), 310 (sh.) m$\mu$ ($\epsilon$=9,300; 5,300; 3,330); $\lambda_{max.}^{KBr}$ 6.15, 6.34$\mu$

Example 39

A solution of 484 mg. (2.0 mmoles) of 2,3-dihydro-7-hydroxy-1-(N-pyrrolidino)-1H-pyrrolo[1,2-α]indole (Example 37) and 15 ml. of methyl iodide in 50 ml. of methanol is kept in the dark at room temperature for 18 hrs. The solution is taken to dryness; addition of acetone to the residue induces crystallization. Filtration gives 0.677 g. (88%) of crystals, M.P. 176–180° (dec.). One recrystallization from water gives white needles, M.P. 181–183° (dec.).

Example 40

A solution of 332 mg. (1 mmole) of 7-benzyloxy-2,3-dihydro-1-(N-pyrrolidino)-1H-pyrrolo[1,2-α]indole (Example 38) and 1 ml. of methyl iodide in 10 ml. of methanol is allowed to stand at room temperature in the dark for 18 hrs. The crystals are collected by filtration to give 362 mg. (78%) of crystals, M.P. 166–168°. Two recrystallizations from water gives glistening white plates, M.P. 156–158°;

$\lambda_{max.}^{CH_3OH}$ 278, 306 mμ ($\epsilon$=10,800, 4,200); $\lambda_{max.}^{KBr}$ 6.12, 6.33, 6.44μ

Example 41

A solution of 76 mg. (0.2 mmole) of 1-(2,3-dihydro-7-hydroxy-1H-pyrrolo[1,2-α]indol-1-yl) - 1 - methylpyrrolidinium iodide (Example 39) and 52 mg. (0.8 mmole) of sodium azide in 2 ml. of water is heated on the steam-bath for 30 min., then cooled and distributed between methylene chloride and water. The dried organic solution is evaporated to give a product which has $\lambda_{max.}^{CH_3OH}$ 280, 300 (sh.) mμ; $\lambda_{max.}^{KBr}$ 4.7μ

Example 42

A mixture of 0.584 g. (2.0 mmoles) of 7-benzyloxy-2,3-dihydro-1-oxo - 1H - pyrrolo[1,2-α]indole (Examples 17, 18), 0.500 g. of hydroxylamine hydrochloride, 10 ml. of ethanol and 3 ml. of pyridine is heated on the steam-bath for 1.5 hr. and filtered to give 0.451 g. of solid, M.P. 246–247° (dec.);

$\lambda_{max.}^{CH_3OH}$ 3.0–3.4μ no carbonyl absorption in the infrared.

Example 43

A mixture of 1.04 g. (4.84 mmoles) of 2,3-dihydro-7-methoxy-6-methyl-1-oxo-1H-pyrrolo[1,2-α]indole (Examples 15, 16), 10 ml. of absolute alcohol and 1.5 g. (99%) of hydrazine hydrate is refluxed, with stirring, for 4 hrs. The reaction mixture is taken to dryness and the residue triturated with ethanol to give 960 mg. (90%) of a yellow solid, M.P. 242–247°;

$\lambda_{max.}^{KBr}$ 2.8, 3.2μ no carbonyl absorption.

Example 44

A solution of 43 mg. (0.20 mmole) of 2,3-dihydro-7-methoxy-6-methyl-1-oxo-1H-pyrrolo[1,2-α]indole (Examples 15, 16) and 33.5 mg. (0.30 mmole) of semicarbazide hydrochloride in 2 ml. of methanol is heated on a steam bath for 2.5 hr., cooled, and the precipitate that forms is collected and dried. This precipitate is 45 mg. (73%) of 2,3-dihydro-7-methoxy - 6 - methyl - 1-oxo-1H-pyrrolo[1,2-α]indole semicarbazone, decomposition above 250°;

$\lambda_{max.}^{KBr}$ 2,8 (m.), 3.0 (m.), 5.87 (s.) μ; $\lambda_{max.}^{CH_3OH}$ 218 ($\epsilon$=12,000), 262 ($\epsilon$=7,000), 335 ($\epsilon$=15,000), 348 ($\epsilon$=14,000) mμ

Example 45

To a solution of 0.500 g. (1.8 mmoles) of 7-benzyloxy-2,3-dihydro-1-oxo - 1H - pyrrolo[1,2-α]indole (Examples 17, 18) in 50 ml. of acetic acid is added 0.500 g. of p-toluenesulfonylhydrazide. The solution is kept at room temperature for 2 hrs., and the material which precipitates during this time is collected by filtration to give 0.690 g. (86%) of solid, M.P. 220–224° (dec.);

$\lambda_{max.}^{KBr}$ 3.02μ no carbonyl absorption.

Example 46

To 1.0 ml. of chilled dimethylformamide is added 306 mg. (2 mmole, 0.2 ml.) of freshly distilled phosphorous oxychloride. The mixture is stirred and cooled for 15 min., then treated with a solution containing 642 mg. (2 mmole) of 1-acetoxy - 7 - benzyloxy - 2,3-dihydro-1H-pyrrolo[1,2-α]indole (Example 35) in 5 ml. of dimethylformamide, added dropwise. After the resulting yellow solution is stirred at ice-bath temperature for 2 hrs. it is poured onto a mixture of ice and 8 ml. of 1 N sodium hydroxide solution. The precipitate that forms is collected, washed with 1% sodium hydroxide solution, dissolved in methylene chloride solution, washed with potassium bicarbonate solution, dried and concentrated. Crystallization of the residue from methanol affords 602 mg. (87%) of 1-acetoxy-7-benzyloxy-9-formyl-2,3-dihydro - 1H - pyrrolo[1,2-α]indole, white plates, M.P. 163–164°;

$\lambda_{max.}^{KBr}$ 3.5 (w.), 3.6 (w.), 5.70 (s.), 6.10 (s.), 8.25 (s.) μ;

$\lambda_{max.}^{CH_3OH}$ 215 ($\epsilon$=32,000), 257 ($\epsilon$=21,000), 276 ($\epsilon$=4,800), 308 ($\epsilon$=11,000) mμ

Example 47

To a solution of 7.5 g. of sodium hydroxide in 10 ml. of water and 140 ml. of methanol is added 1.31 g. (3.75 mmole) of 1-acetoxy-7-benzyloxy-9-formyl-2,3-dihydro-1H-pyrrolo[1,2-α]indole (Example 46). The resulting mixture is heated on a steam-bath for 20 min., cooled and concentrated to 20 ml. The concentrate is treated with ether-methylene chloride (1:1) and water. The organic layer is washed with potassium bicarbonate solution, dried and concentrated. Crystallization of the residue from methanol, with charcoal decolorization, affords 719 mg. (58%) of 7-benzyloxy-9-formyl-2,3-dihydro-1-hydroxy-1H-pyrrolo[1,2-α]indole, M.P. 126–130°;

$\lambda_{max.}^{KBr}$ 2.9 (s.), 3.6 (w.), 3.7 (w.), 6.15 (s.) μ; $\lambda_{max.}^{CH_3OH}$ 216 ($\epsilon$=33,000); 257 ($\epsilon$=27,000), 275 ($\epsilon$=14,000), 308 mμ ($\epsilon$=13,000)

Example 48

An ice-cooled solution of 102 mg. (0.33 mmole) of 7-benzyloxy-9-formyl - 2,3 - dihydro-1-hydroxy-1H-pyrrolo[1,2-α]indole (Example 47) in 1 ml. of pyridine is treated with a slurry of 100 mg. (1.0 mmole) of chromium trioxide in 5 ml. of pyridine. The mixture is stirred at 5° for 54 hrs., then treated with water and methylene chloride. The methylene chloride layer is filtered, washed with potassium bicarbonate solution, dried and concentrated. Crystallization of the residue from ethanol with charcoal decolorization affords 48 mg. (47%) of 7-benzyloxy-9-formyl-2,3-dihydro - 1 - oxo-1H-pyrrolo[1,2-α]indole, M.P. 194–197°;

$\lambda_{max.}^{KBr}$ 3.6 (w.), 3.7 (w.), 5.8 (s.), 6.10 (s.) μ; $\lambda_{max.}^{CH_3OH}$ 208 ($\epsilon$=32,000), 245 ($\epsilon$=20,000), 253 ($\epsilon$=21,000), 262 ($\epsilon$=15,000), 280 ($\epsilon$=7,300), 343 mμ ($\epsilon$=16,000)

Example 49

To 1 ml. of ice-chilled dimethylformamide is added 0.306 g. (2.0 mmoles, 0.2 ml.) of phosphorus oxychloride. The solution is magnetically stirred with external cooling for 15 min. A solution of 6.64 g. (2.0 mmoles) of 7 - benzyloxy - 2,3-dihydro-1-(N-pyrrolidino)-1H-pyrrolo[1,2-α-indole] Example 38) in 5 ml. of dimethylformamide is added dropwise over 15 min. The resulting orange solution is magnetically stirred for 3.75 hrs. and kept in the refrigerator for 16 hrs; it is then poured into a cracked ice-1% sodium hydroxide solution mixture and extracted with methylene chloride. The extract is washed with sodium bicarbonate solution and water, dried and evaporated to give product, $\lambda_{max.}^{CH_3OH}$ 258, m$\mu$; $\lambda_{max.}^{KBr}$ 3.5, 6.10$\mu$

Example 50

A mixture of N-methylformanilide (1.54 g., 0.0114 mole) and freshly distilled phosphorous oxychloride (1.76 g., 0.0114 mole) is stirred at room temperature for 15 min. Ethylene dichloride (10 ml.) is added and the reaction mixture is cooled to 0°. To the reaction mixture is added 1 g. (4.96 mmoles) of 2,3-dihydro-7-methoxy-6-methyl-1H-pyrrolo[1,2-α]indole (Example 25) and the solution is heated at reflux for 20 min. The solution is cooled and is poured, with vigorous stirring, into 50 ml. of cold water containing 6 g. of sodium acetate. The solvent is removed by steam-distillation and after chilling the mixture is filtered to give 985 mg. of a reddish solid, M.P. 190–192°.

The filtrate is extracted with methylene chloride. The extract is dried over anhydrous sodium sulfate and taken to dryness. Crystallization of the residue from methylene chloride-petroleum ether (30–60°) furnished white crystals, M.P. 195–197°;

$\lambda_{max.}^{CH_3OH}$ 256 m$\mu$ ($\epsilon$=18,200), 282 m$\mu$ ($\epsilon$=16,800), 309 m$\mu$ ($\epsilon$=13,500); $\lambda_{max.}^{KBr}$ 3.56, 3.66, 6.06, 6.5, 7.95$\mu$

Example 51

To 0.5 ml. of ice-cooled dimethylformamide is added 71 mg. (0.4 mmole) of freshly distilled phosphorous oxychloride. The mixture is stirred and cooled for 15 min., then treated with a suspension of 122 mg. (0.47 mmole) of 7 - benzyloxy - 2,3-dihydro-1H-pyrrolo[1,2-α]indole (Example 26) in a 2 ml. of dimethylformamide. The yellow solution that forms is stirred at 35° for 1 hr., then poured onto ice. A pink solid (starting material) that precipitates is collected on a filter. The filtrate is made alkaline with dilute sodium hydroxide solution and the pale yellow solid that forms is washed with water and dried. In this manner there is obtained 65 mg. (48%) of 7 - benzyloxy-9-formyl - 2,3-dihydro-1H-pyrrolo[1,2-α]indole, M.P. 157°, $\lambda_{max.}^{KBr}$ 3.6 (w.), 3.8 (w.) 6.2 (s.)$\mu$; $\lambda_{max.}^{CH_3OH}$ 215 ($\epsilon$=33,000), 257 ($\epsilon$=20,000), 276 ($\epsilon$=14,000), 308 m$\mu$ ($\epsilon$=12,000)

Example 52

To a boiling suspension of 500 mg. (2.33 mmoles) of 2,3-dihydro - 9 - formyl-7-hydroxy-6-methyl-1H-pyrrolo [1,2-α]indole (Example 55) in 15 ml. of absolute alcohol is added 176 mg. (4.66 mmoles) of sodium borohydride. The reaction mixture is refluxed for 1–2 min. and then allowed to come to room temperature (1 hr.). The reaction mixture is filtered to give untreated starting material. The filtrate is taken to dryness and the residue is extracted with methylene chloride. The combined extracts are dried over sodium sulfate, filtered, and concentrated with addition of petroleum ether (30–60°) to give white crystals which decompose at 200° C.

$\lambda_{max.}^{KBr}$ 2.9, 3.3$\mu$ no carbonyl absorption.

Example 53

To a boiling solution of 500 mg. (2.18 mmoles) of 2,3-dihydro - 9 - formyl-7-methoxy-6-methyl-1H-pyrrolo [1,2-α]indole (Example 50) in 30 ml. of absolute ethanol is added 166 mg. (4.38 mmoles) of sodium borohydride. The reaction mixture is refluxed for 10 min., let stand at room temperature for 40 min. and finally refluxed for another 10 min. The reaction mixture is then cooled and filtered to give 418 mg. (83%) of white solid, M.P. 100–165°;

$\lambda_{max.}^{CH_3OH}$ 218, 282, 298 m$\mu$ no carbonyl absorption in the infrared.

Example 54

To a chilled solution of 328 mg. (1.42 mmoles) of 2,3-dihydro-9-hydroxymethyl-7-methoxy - 6 - methyl-1H-pyrrolo[1,2-α]indole (Example 53) in 4 ml. of dry pyridine is added with stirring 221 mg. (1.42 mmoles) of phenyl chloroformate. The reaction mixture is stirred at room temperature for 2 hours, water is then added to the solution and the resulting solid filtered to give 65 mg., M.P. 229–232°, of product;

$\lambda_{max.}^{KBr}$ no hydroxyl band, 5.7, 8–8.2$\mu$

Example 55

A mixture of 2,3-dihydro-9-formyl-7-methoxy-6-methyl-1H-pyrrolo[1,2-α]-indole (Example 50) (3 g., 0.0131 mole) and aluminum chloride (3.4 g., 0.0256 mole) in xylene (140 ml.) is refluxed with vigorous stirring for 5 hrs. After cooling, the reaction mixture is poured onto ice and digested. The resulting red solid is filtered to give 2.36 g. (84%), M.P. >300°. Recrystallization from a large volume of acetone furnishes white crystals, M.P. >300°;

$\lambda_{max.}^{CH_3OH}$ 256 ($\epsilon$=15,910), 283 ($\epsilon$=14,910), 311 m$\mu$ ($\epsilon$=13,000); $\lambda_{max.}^{KBr}$ 3.08, 3.35, 3.53, 6.1, 6.5, 8.05$\mu$

Example 56

A mixture of 645 mg. (3 mmole) of 2,3-dihydro-7-methoxy-6-methyl-1-oxo-1H-pyrrolo[1,2-α]indole (Examples 15, 16) 800 mg. (6 mmole) of anhydrous aluminum chloride and 20 ml. of xylene is stirred in a nitrogen atmosphere and heated at reflux temperature for 5 hrs. It is then cooled and decomposed with ice and dilute hydrochloric acid and extracted into ethyl acetate. The ethyl acetate solution is washed with water, dried and concentrated. The glassy solid residue (536 mg.) is dissolved in 75 ml. of the lower and 25 ml. of the upper phase of the system 70 heptane:30 ethyl acetate:15 methanol:6 water and mixed with 150 g. of diatomaceous earth. This pack is placed atop a column (7.2 cm. dia.) of 700 g. of diatomaceous earth admixed with 350 ml. of the lower phase described above, and the upper phase is passed through the column. The hold-back volume is 1700 ml. The effluent is passed through a recording ultraviolet spectrophotometer set at 330 m$\mu$. The product is contained in hold-back volumes 3.5–5.0. Concentrations of this effluent affords 139 mg. (23%) of 2,3-dihydro-7-hydroxy-6-methyl-1-oxo-1H-pyrrolo[1,2-α]indole, orange powder, M.P. 255° (dec.);

$\lambda_{max.}^{KBr}$ 3.05 (s.), 5.95 (s.) $\mu$; $\lambda_{max.}^{CH_3OH}$ 216 ($\epsilon$=31,000), 332 m$\mu$ ($\epsilon$=20,000)

Example 57

A solution of 215 mg. (1.9 mmoles) of 2,3-dihydro-9-formyl-7-hydroxy-6-methyl-1H-pyrrolo[1,2-α]indole (Example 55) in 250 ml. of boiling acetone is added with stirring, to a previously prepared light blue solution prepared from 402 mg. (1.5 mmoles) of potassium nitrosodisulfonate (Fremy's salt), 30 ml. of a M/6 potassium dihydrogen phosphate buffer solution, and 60 ml. of water. The light blue solution turns to a dark purple color and 60 ml. of water is added. The solution is extracted with methylene chloride. The extract is washed with saline solution, dried over anhydrous sodium sulfate and is taken to dryness. The residue is triturated with ether and filtered to give 92 mg. (40%) of black solid, M.P. 230–240° (dec.). One recrystallization from methylene chloride-petroleum ether (30–60°) gives shiny black crystals, M.P. 230–234° (dec.);

$\lambda_{max.}^{CH_3OH}$ 225 ($\epsilon$=86,700), 280 ($\epsilon$=22,500), 345 m$\mu$ ($\epsilon$= 11,420); $\lambda_{max.}^{KBr}$ 3.5, 6.0, 6.1, 6.44$\mu$

Example 58

To a solution of 268 mg. (1 mmole) of Fremy's salt in 20 ml. of M/6 potassium dihydrogen phosphate solution and 40 ml. of water is added a solution of 100 mg. (0.5 mmole) of 2,3 - dihydro - 7 - hydroxy-6-methyl-1-oxo-1H-pyrrolo[1,2-α]indole (Example 56) in 25 ml. of acetone. The Fremy's salt is decolorized instantly and the dark red solution that forms is diluted with 65 ml. of water and extracted with 200 ml. of ethyl acetate. This extract is washed with brine, dried and concentrated. Crystallization from acetone-benzene fails to purify the residue. It is then dissolved in 3 ml. of the lower phase of the system 50 heptane:50 ethyl acetate:15 methanol:6 water and mixed with 6 g. of diatomaceous earth. This pack is placed atop a column (1.75 cm. dia.) of 50 g. of diatomaceous earth admixed with 25 ml. of the lower phase of the solvent system described above, and the upper phase is passed through the column. The hold-back volume is 66 ml. The effluent is passed through a recording ultraviolet spectrophotometer set at 300 m$\mu$. The product is contained in hold-back volumes 3.8–5.5. Concentration of this effluent affords 30 mg. (28%) of 2,3-dihydro-6-methyl-1,7,8-trioxo-1H-pyrrolo[1,2-α]indole, red prisms, dec. 230°;

$\lambda_{max.}^{KBr}$ 5.7 (s.), 6.0 (s.) $\mu$; $\lambda_{max.}^{CH_3OH}$ 300 ($\epsilon$=19,000), 510 m$\mu$ ($\epsilon$=750)

Example 59

A solution of 15 mg. of 2,3-dihydro-6-methyl-1,7,8-trioxo-1H-pyrrolo[1,2-α]indole (Example 58) in 150 ml. of methanol is mixed with 1350 ml. of 0.1 N hydrochloric acid solution. The resulting pink solution is kept at 25° and its ultraviolet absorption spectrum is determined at intervals. After 10 days it has $\lambda_{max.}$ 290 m$\mu$ and it is yellow in color. It is then saturated with salt and extracted with 500 ml. of ether. This extract is dried and concentrated. Crystallization of the residue from acetone affords 2.8 mg. (17%) of 2,3 - dihydro - 7 - hydroxy - 6 - methyl - 1,5,8 - trioxo - 1H - pyrrolo[1,2-α]indole, yellow needles, M.P. 265° (dec.), $\lambda_{max.}^{KBr}$ 3.05 (m.), 5.8 (s.), 6.0 (s.), 6.10 (s.) $\mu$; $\lambda_{max.}^{CH_3OH}$ 290 m$\mu$ ($\epsilon$=19,000)

violet solution in dilute alkali.

Example 60

Freshly prepared potassium t-butoxide is suspended in freshly distilled tetrahydrofuran. On addition of a tetrahydrofuran solution of an equimolar quantity of ethyl 5-benzyloxy-2-indolecarboxylate the suspended solid dissolves. An equimolar quantity of acrylamide is added to the solution which is then heated at reflux for 3 days. Within 1 hr., white solid precipitates. The reaction mixture is cooled, acidified with hydrochloric acid and the solvent is removed in vacuo. The hard amber residue is pulverized and extracted with boiling methylene chloride three times to leave a cream-colored solid residue (61%). The solid is recrystallized from acetonitrile to give white lustrous plates, M.P. 228–9°, $\lambda_{max.}^{CHOH}$ 318 m$\mu$; $\lambda_{max.}^{KBr}$ 3.57, 5.81, 6.04, 6.21, 6.58, 8.18$\mu$

Example 61

Two molar equivalents of lithium borohydride are added to a tetrahydrofuran solution of 7-benzyloxy-2,3-dihydro-1-oxo-1H-pyrrolo[1,2-α]indole - 2 - carboxamide (Example 60). The solution is stirred at room temperature and solid soon begins to precipitate. After stirring 18 hrs. at room temperature, the solid is collected and washed with 1 N sodium hydroxide solution and then with water. Additional product is obtained from the mother liquor by concentration to dryness, followed by washing with 1 N sodium hydroxide solution and with water. The solid is slightly yellow. This color is removed by treating a tetrahydrofuran solution of the product with charcoal and then concentrating until solid precipitates. The product could not be recrystallized from ordinary solvent systems. It shows no sign of physical change below 350°, $\lambda_{max.}^{CH_3OH}$ 294 m$\mu$, $\lambda_{max.}^{KBr}$ 2.95, 6.14, 6.59, 6.86, 8.43$\mu$

Example 62

7-Benzyloxy-2,3-dihydro-1-hydroxy-1H-pyrrolo[1,2-α]-indole-2-carboxamide (Example 61) is dissolved in 20 molar equivalents of hydrazine hydrate and the solution is refluxed for 17 hrs. Ammonia is evolved. A solid precipitates from the reaction mixture on cooling. It is washed with water, dried and recrystallized from boiling methanol to give white, silky needles, M.P. 177–170°;

$\lambda_{max.}^{CH_3OH}$ 293° m$\mu$

Example 63

A mixture of 1.172 g. (4.0 moles) of 9-bromo-2,3-dihydro - 7 - methoxy-6-methyl-1-oxo-1H-pyrrolo[1,2-α]indole (Example 20), 0.44 ml. of hydrazine hydrate, 720 mg. of potassium hydroxide pellets and 20 ml. of diethylene glycol is heated at 120°–140° for 90 min. The cooled mixture is diluted with water and extracted several times with benzene. The combined, dried benzene extracts are passed through a Florisil column, benzene being used as the wash liquid. The solid in the first 500 ml. of eluate is recrystallized from petroleum ether (B.P. 60–70°) to give white needles, dec. at 93–95°;

$\lambda_{max.}^{CH_3OH}$ 288: 298, 307 (sh.) m$\mu$ no carbonyl in the infrared spectrum.

Example 64

A mixture of 183 mg. (0.76 mmole) of 2,3-dihydro-7-methoxy - 6 - methyl - 1-oxo-1H-pyrrolo[1,2-α]indole-9-carbonitrile (Example 22), 0.1 ml. of hydrazine hydrate, 140 mg. of potassium hydroxide pellets and 5 ml. of diethylene glycol is heated at 120–140° for 90 min. The cooled mixture is diluted with water and extracted with benzene; the solvent is removed from the dried extracts to give a residue which on recrystallization from methanol furnishes 20 mg. of white needles, M.P. 165–170° C. The ultraviolet and infrared spectra of this material are the same as the spectra of the material described in the following example.

Example 65

A solution of 0.500 g. (2.18 mmoles) of 2,3-dihydro-9-formyl-7-methoxy-6-methyl-1H-pyrrolo[1,2-α]indole (Example 50) and 1.000 g. (4.45 mmoles) of O,N-bis-trifluoroacetylhydroxylamine in 25 ml. of benzene, containing 0.5 ml. of pyridine, is heated at reflux temperature for 3 hours. The cooled solution is washed with water, dried, and passed through a Florisil (a synthetic magnesium silicate) column, benzene being used as the wash liquid. The solid in the first 625 ml. of eluate is recrystallized from methanol to give white needles, M.P. 173.0–173.5°;

$\lambda_{max.}^{MeOH}$ 280, 294, 305 m$\mu$; $\lambda_{max.}^{KBr}$ 4.50, 8.10, 9.60$\mu$

Example 66

A solution of 166 mg. of sodium nitrite in 2 ml. of water is added to a magnetically stirred solution of 500 mg. of 2,3-dihydro-7-methoxy-6-methyl-1-oxo-1H-pyrrolo

[1,2-α]indole (Examples 15, 16) in 7.5 ml. of acetic acid and 1 ml. of concentrated sulfuric acid at 3–5°. The dark solution is stirred at room temperature for 20 min. and then poured into water and extracted with methylene chloride. The dried organic solution is taken to dryness and the residue is recrystallized from acetone-petroleum ether (B.P. 60–70°) to give yellow-green needles, dec. at about 190°;

$\lambda_{max.}^{KBr}$ 5.80, 6.40, 6.55, 7.80, 8.00, 8.24, 8.67, 9.28, 9.70μ

Example 67

A solution of 1.780 g. (5.0 mmoles) of 7-benzyloxy-2-bromo-1,2-dihydro-1-oxo-1H - pyrrolo[1,2-α]indole (Example 24) and 5.00 g. of potassium acetate in 40 ml. of glacial acetic acid is heated at reflux temperature with magnetic stirring for 90 min. The cooled solution is diluted with water and is extracted with methylene chloride. The combined extracts are washed with saline, dried over magnesium sulfate and taken to dryness. Several recrystallizations of the residue from methanol gives white plates, M.P. 149–151°;

$\lambda_{max.}^{MeOH}$ 327 mμ (ε = 22,100); $\lambda_{max.}^{KBr}$ 5.72, 5.79, 6.50, 8.08, 8.36μ

Example 68

A suspension of 245 mg. (0.73 mmole) of 2-acetoxy-7-benzyloxy - 2,3 - dihydro-1-oxo-1H-pyrrolo[1,2-α]indole (Example 67) in 10 ml. of boiling methanol is treated with 51 mg. (1.34 mmoles) of sodium borohydride. All solid dissolves almost immediately and the solution is kept at room temperature for 1 hr. The solvent is removed, and the residue is distributed between methylene chloride and a 1% sodium hydroxide solution. The dried organic layer is taken to dryness, and the residue is recrystallized from acetone to give 78 mg. of microcrystals, dec. 141–144°;

$\lambda_{max.}^{KBr}$ 288μ

Example 69

A suspension of 400 mg. of 9-formyl-2,3-dihydro-7,8-dioxo-6-methyl-1H-pyrrolo[1,2-α]indole (Example 57) in 6 ml. of acetic anhydride containing 0.125 ml. of boron trifluoride etherate is warmed on the steam bath. The reaction mixture is then magnetically stirred at room temperature for several hours. After pouring into ice-water, the reaction mixture is extracted with methylene chloride. The methylene chloride solution is washed several times with water and then dried with sodium sulfate. The solvent is evaporated with addition of petroleum ether (30–60°) to give 500 mg. (77%) of a white solid. One recrystallization from methylene-chloride-petroleum ether (30–100°) gives white crystals, M.P. 268–270° (dec.);

$\lambda_{max.}^{CH_3OH}$ 218, 248, 305 mμ; (ε = 2800; 1830; 1120); $\lambda_{max.}^{KBr}$ 5.65, 5.95, 8.2–8.5μ

Example 70

To a magnetically stirred suspension containing 300 mg. of 5,7,8-triacetoxy-9-formyl-2,3-dihydro - 6 - methyl-1H-pyrrolo[1,2-α]indole (Example 69) in 20 ml. of water, under a nitrogen atmosphere, is added 2.4 ml. of 25% sodium hydroxide. The reaction mixture is heated on the steam bath until solution is essentially complete. Any insoluble material is filtered and for several hours air is bubbled into the filtrate which contains 2,3-dihydro-9-formyl-6-methyl-5,7,8-trihydroxy-1H-pyrrolo[1,2 - α]indole. The solution turns a dark purple. The solution is acidified with 2.4 ml. of unconcentrated hydrochloric acid and is extracted with methylene chloride. The organic phase is washed with saline solution and then dried over sodium sulfate. The solvent is evaporated on the steam bath with addition of petroleum ether (30–60°) to give an orange solid. Recrystallization from methylene chloride-petroleum ether (30–60°) gives orange crystals, M.P. 225–227°;

$\lambda_{max.}^{MeOH}$ 219, 299, 330 mμ; (ε = 2134; 1445; 810); $\lambda_{max.}^{KBr}$ 2.95, 5.9, 6, 6.07μ

Example 71

To a solution of potassium t-butoxide, prepared by dissolving 0.624 g. (16 g. at.) of potassium in 30 ml. of t-butyl alcohol, is added a solution of 4.53 g. (15.5 mmoles) of ethyl 7-benzyloxy-2-indolecarboxylate in 20 ml. of t-butyl alcohol. The mixture is stirred for 15 min., treated with 0.85 g. (16 mmoles) of acrylonitrile, and heated at reflux temperature for 2 days. It is poured into water, acidified with dilute hydrochloric acid and the precipitate that results is washed with water and dried. Crystallization of this precipitate from acetone-petroleum ether (60–70°) affords 2.35 g. (53%) of 7-benzyloxy-2-cyano-2,3-dihydro-1-oxo - 1H - pyrrolo[1,2-α]indole, pale yellow plates, M.P. 225–230°; λ$_{max.}$ 4.4 (C≡N), 5.85 (C=O, s.) μ; 328 (ε 21,000) mμ.

Example 72

A suspension of 431 mg. (1.4 mmoles) of 7-benzyloxy-2-cyano-2,3-dihydro-1-oxo-1H-pyrrolo[1,2-α]indole (Example 71) in 20 ml. of tetrahydrofuran is treated with 62 mg. (2.8 mmoles) of lithium borohydride. The mixture is stirred 16 hours, acidified with acetic acid and concentrated. The residue is washed well with water and dried. This crude product (310 mg.) is dissolved in 20 ml. of the lower phase of the system 85 heptane:15 ethyl acetate:17 methanol:4 water and mixed with 40 g. of Celite diatomaceous earth. This pack is placed atop a column (3.7 cm. dia.) of 300 g. of Celite and mixed with 150 ml. of the lower phase described above, and the upper phase is passed through the column. The hold-back volume is 490 ml. The effluent is passed through a recording spectrophotometer that is set at 278 mμ. The product appears in two parts: the first part in hold-back volumes 4.0–6.0; the second part in hold-back volumes 6.4–8.0. Both parts are concentrated. The first part affords 100 mg. of white plates, M.P. 192–196°; λ$_{max.}$ 2.9 (O—H), 4.4 (C≡N) μ; λ$_{max.}$ 250 (ε 44,000), 278 (ε 9,300), 300 (ε 4,400) sh., 312 (ε 2,900) sh. μ. The second fraction affords 40 mg. of white plates, M.P. 185–192°; λ$_{max.}$ 2.09 (O—H), 4.4 (C≡N) μ; λ$_{max.}$ 220 (ε 44,000), 278 (ε 9,300), 300 (ε 4,400) sh., 312 (ε 2,900) sh. μ.

Example 73

A solution of 102 mg. (0.33 mmole) of 7-benzyloxy-9-formyl-2,3-dihydro-1-oxo-1H-pyrrolo[1,2 - α]indole (Example 48) in 5 ml. of ethanol and 5 ml. of pyridine is treated with 23 mg. (0.33 mmole) of hydroxylamine hydrochloride and the mixture is heated at steam bath temperature for 2 hours, cooled and poured into water. The pale yellow precipitate of 7-benzyloxy-2,3-dihydro-9-isonitrosomethyl-1-oxo-1H-pyrrolo[1,2-α]indole is washed well with water and dried. Yield 94 mg. (89%) of product with M.P. 235–237°;

$\lambda_{max.}^{KBr}$ 2.98 (O—H), 5.90 (1-ketone), no 9-formyl; $\lambda_{max.}^{CH_3OH}$ 259 (ε 20,000), 337 (ε 21,000), 370 (ε 5,000) sh.

Example 74

A solution of 20 mg. (0.067 mmole) of 7-benzyloxy-9-formyl-2,3-dihydro-1-oxo-1H-pyrrolo[1,2-α]indole (Example 48) in 1 ml. of ethanol and 1 ml. of pyridine is treated with 9.0 mg. (0.13 mmole) of hydroxylamine hydrochloride and the mixture is heated on a steam bath for 2 hrs., cooled, poured into water and extracted with ether. The ether extract is washed with water, dried, concentrated and toluene is distilled from the residue to remove traces of pyridine. The yellow solid residue of 7-benzyloxy - 2,3 - dihydro - 9 - isonitrosomethyl - 1 - oximino-1H-pyrrolo[1,2-α]indole has λ$_{max.}$ 2.90 (O—H, s.) no C=O; λ$_{max.}$ 235 (ε 19,000), 271 (ε 23,000), 282 (ε 19,000) sh., 328 (ε 22,000) mμ.

Example 75

A mixture of 175 mg. of 2-acetoxy-7-benzyloxy-2,3-dihydro-1-oxo-1H-pyrrolo[1,2-α]indole (Example 67), 2 ml. of ethanol, 2 ml. of pyridine and 35 mg. of hydroxylamine hydrochloride is heated on a steam bath for 2 hrs. It is then concentrated under reduced pressure and the residue is washed well with water, dried and crystallized from methanol. This procedure affords 2-acetoxy - 7 - benzyloxy - 2,3 - dihydro - 1H - pyrrolo-[1,2-α]indole-1-oxime as white needles, M.P. 162–166°;

$$\lambda_{max.}^{KBr} \; 3.0, \; 5.75, \; 8.15\mu; \; \lambda_{max.}^{CH_3OH} \; 319 \; m\mu$$

Example 76

A solution of 487 mg. of 7-benzyloxy-2,3-dihydro-1-oxo-1H-pyrrolo[1,2-α]indole oxime (Example 42) in 150 ml. of tetrahydrofuran is cooled to 0° and treated with 5 ml. of a 20% potassium hydroxide solution and 318 mg. of p-toluenesulfonyl chloride. The aqueous layer is separated after 2 hours and the organic layer is washed with brine, dried and treated with petroleum ether (60–70°) until crystallization results. The crystals are treated with benzene and the mixture is filtered. The filtrate is treated with charcoal, filtered and cooled and treated with petroleum ether (60–70°) until crystals form. White plates, dec. >150°, are obtained;

$$\lambda_{max.}^{KBr} \; 7.33, \; 8.4\mu; \; \lambda_{max.}^{CH_3OH} \; 312 \; m\mu$$

Example 77

A solution of 276 mg. of 7-benzyloxy-2,3-dihydro-1-oxo-1H-pyrrolo[1,2-α]indole (Examples 17, 18) in 4 ml. of ethanol and 4 ml. of pyridine is treated with 83.5 mg. of methoxyamine hydrochloride and the mixture is heated at 80° for 2 hours. It is then cooled to 5° and white plates of 7-benzyloxy-2,3-dihydro-1H-pyrrolo[1,2-α]indole-1-methyloxime are formed, M.P. 146–149°;

$$\lambda_{max.}^{KBr} \; 9.55, \; 9.9\mu, \; \lambda_{max.}^{CH_3OH} \; 319 \; m\mu$$

Example 78

A suspension of 4.8 g. (0.0176 mole) of methyl 1-(β-cyanoethyl)-5-methoxy-6-methyl - 2 - indolecarboxylate (Example 9) in 100 ml. of 10% potassium hydroxide is refluxed, with stirring for 3 hours, during which time solution occurs. The reaction mixture is cooled, acidified with concentrated hydrochloric acid, and the precipitate is filtered to give 4.7 g. of white solid, M.P. 230–231° C.

Example 79

A solution of 0.860 g. (3.92 mmoles) of methyl 5-methoxy-6-methyl-2-indolecarboxylate (Example 7) and 0.344 g. (4.00 mmoles, 0.35 ml.) of methyl acrylate in 15 ml. of dioxane containing 0.5 ml. of 35% aqueous benzyl trimethyl ammonium hydroxide is heated at 50° for 30 min. and then magnetically stirred at room temperature for 63 hours. The solution is diluted with water containing acetic acid and extracted with methylene chloride. The extract is dried and evaporated to give a residue which is crystallized from dilute methanol to give 0.311 g. of methyl 5-methoxy-6-methyl-2-indolecarboxylate. Concentration of the mother liquor gives a solid with $$\lambda_{max.}^{KBr} \; 5.91, \; 6.60, \; 8.05, \; 8.25\mu$$

Example 80

By the procedure of Example 78, methyl 2-carbomethoxy-5-methoxy-6-methyl - 1 - indolepropionate (Example 79) is treated with a 10% potassium hydroxide solution to give the product as a white solid, M.P. 228–231° C.

Example 81

A solution of 900 mg. (3.14 mmoles) of 2-carboxy-1-(β-carboxyethyl)-5-methoxy-6-methyl indole (Example 78) 60 mg. of potassium cyanide and 35 ml. of acetic anhydride is refluxed for 20 hours. The acetic anhydride is removed in vacuo and the residue is dissolved in a mixture of 25 ml. 10% potassium hydroxide and 25 ml. of ethanol. The solution is refluxed for one hour. The alcohol is removed in vacuo and the aqueous phase is extracted with methylene chloride. The organic phase is treated with decolorizing charcoal, dried over magnesium sulfate and is taken to dryness in vacuo. The residue is recrystallized from methylene chloride-petroleum ether (30–60°) to give white crystals, M.P. 210–215° C.

Example 82

A warm solution of ethyl 5-benzyloxy-6-methyl-2-indolecarboxylate (Example 8) in dry xylene is added to a well-stirred suspension of freshly prepared potassium tertiary-butoxide in dry xylene. Ethyl acrylate is added to the mixture which is refluxed for 40 hours. The mixture contains a solid which dissolves on acidification with 3 N hydrochloric acid. The mixture is extracted with methylene chloride and the organic layer is separated, dried, and concentrated to an oil that solidifies on treatment with methanol. The brown-yellow solid, M.P. 133–138° (ethanol), is dissolved in ethanol (charcoal) and ether is added. The solvent is slowly evaporated to dryness and white silky needles, M.P. 87–88°, are separated from a hard yellow-brown solid.

Example 83

Ethyl 5 - benzyloxy-1-(β-carbethoxyethyl)-6-methyl-2-indolecarboxylate (Example 82) is added to a stirred freshly-prepared suspension of potassium tertiary-butoxide in anhydrous benzene. The mixture is refluxed for four days. The reaction mixture is cooled, acidified with dilute hydrochloric acid, and then extracted with methylene chloride. The combined extracts are dried and then evaporated to dryness. The residual material is recrystallized twice from ethanol to give a white solid melting at 139–141° C.

Example 84

A solution of 2.0 g. of 7-benzyloxy-2-bromo-2,3-dihydro-1-hydroxy-1H-pyrrolo[1,2-α]indole (Example 34) in ethanol is treated with an aqueous solution containing 5 molar equivalents of sodium azide at reflux temperature for 5 days. The solution is concentrated until solid begins to precipitate then water is added and an ochre solid is collected in 95% crude yield. On recrystallization from ethanol (65% yield) an ochre solid, M.P. 120–122°, is obtained.

Example 85

A mixture of 257 mg. of 7-benzyloxy-2,3-dihydro-1,2-dihydroxy-1H-pyrrolo[1,2-α]indole (Example 68), 143 mg. of sodium acetate and 7 ml. of acetic anhydride is heated on a steam bath for 90 minutes. It is cooled, poured into water and the white precipitate that forms is collected, dissolved in methylene chloride, washed with sodium bicarbonate solution, dried and concentrated. Crystallization of the residue from petroleum ether affords 207 mg. of 1,2-diacetoxy-7-benzyloxy-2,3-dihydro-1H-pyrrolo[1,2-α]indole as white plates, M.P. 114–116°;

$$\lambda_{max.}^{CH_3OH} \; 278 \; (\epsilon=10,000) \; m\mu; \; \lambda_{max.}^{KBr} \; 5.70, \; 8.05\mu$$

We claim:
1. A compound of the formula:

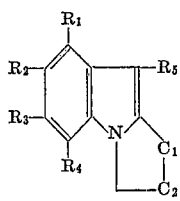

wherein $R_1$ is a member of the group consisting of hydrogen, hydroxy, and lower alkanoyloxy; $R_2$ is a member of the group consisting of hydroxy, lower alkoxy, lower alkanoyloxy, and phenyl lower alkoxy; $R_3$ is a member of the group consisting of hydrogen and lower alkyl; $R_4$ is a member of the group consisting of hydrogen, hydroxy and lower alkanoyloxy; $R_5$ is a member of the group consisting of hydrogen, formyl, cyano, α-hydroxylower alkyl, nitroso, halogen, α-(phenoxycarbonyloxy)lower alkyl, and isonitrosolower alkyl; and

is a member selected from the group consisting of

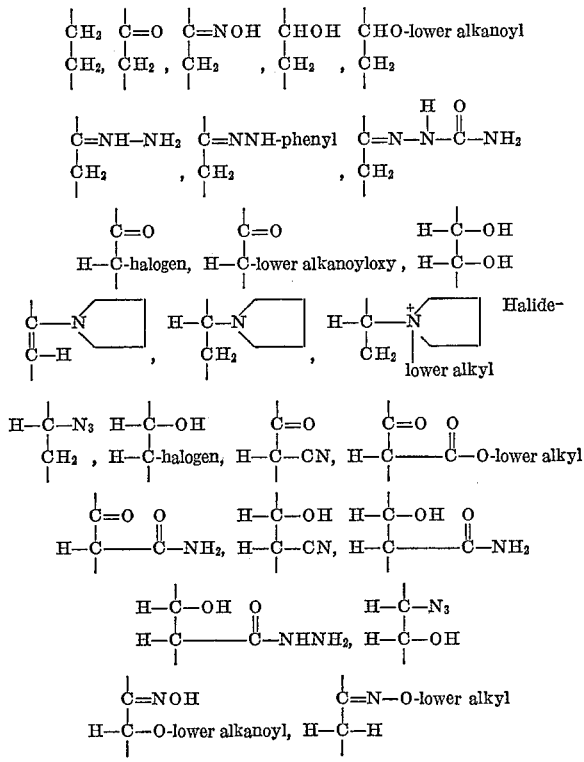

and $$\begin{array}{c} | \\ C=N-O-SO_2\text{-}p\text{-tolyl} \\ | \\ H-C-H \\ | \end{array}$$

2. 2,3 - dihydro-7-methoxy-6-methyl-1-oxo-1H-pyrrolo-[1,2-α]indole.

3. 7 - benzyloxy - 2,3-dihydro-6-methyl-1-oxo-1H-pyrrolo[1,2-α]indole.

4. 7 - benzyloxy-2,3-dihydro-1-oxo-1H-pyrrolo[1,2-α]indole.

5. 7 - benzyloxy - 2-bromo-2,3-dihydro-1-oxo-1H-pyrrolo[1,2-α]indole.

6. 2,3 - dihydro - 7 - methoxy-6-methyl-1H-pyrrolo-[1,2-α]indole.

7. 7 - benzyloxy - 2,3 - dihydro-9-formyl-1-hydroxy-1H-pyrrolo[1,2-α]indole.

8. 7 - benzyloxy - 1 - (N-pyrrolidino)-3H-pyrrolo-[1,2-α]indole.

9. 6 - lower alkyl - 1,2-dihydro-7,8-dioxo-1H-pyrrolo-[1,2-α]indole.

10. 9 - formyl - 2,3 - dihydro-7,8-dioxo-6-methyl-1H-pyrrolo[1,2-α]indole.

11. 2,3 - dihydro - 6 - methyl-1,7,8-trioxo-1H-pyrrolo-[1,2-α]indole.

12. A compound of the formula:

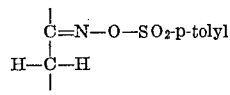

wherein $R_6$ is a member of the group consisting of β-carbolower alkoxy lower alkyl, β-carboxylower alkyl, and β-carboxamidolower alkyl; $R_7$ is a member of the group consisting of carbolower alkoxy and carboxy; $R_8$ is a member of the group consisting of lower alkyl and phenyl lower alkyl; and $R_9$ is lower alkyl.

References Cited by the Examiner
UNITED STATES PATENTS 2,707,187  4/55  Koehneke _____ 260—319

OTHER REFERENCES

Cram et al.: Organic Chemistry. McGraw-Hill Book Co., Inc., pages 313–314, 328.

NICHOLAS S. RIZZO, *Primary Examiner.*